(12) United States Patent  (10) Patent No.: US 8,203,601 B2
Kida et al.  (45) Date of Patent: Jun. 19, 2012

(54) ELECTRONIC APPLIANCE

(75) Inventors: Shingo Kida, Kanagawa-ken (JP);
Masahiro Kitaura, Kanagawa-ken (JP)

(73) Assignee: JVC Kenwood Corporation,
Yokohama-shi, Kanagawa (JP)

( * ) Notice: Subject to any disclaimer, the term of this patent is extended or adjusted under 35 U.S.C. 154(b) by 1266 days.

(21) Appl. No.: 11/979,236

(22) Filed: Oct. 31, 2007

(65) Prior Publication Data

US 2008/0151045 A1 Jun. 26, 2008

(30) Foreign Application Priority Data

Dec. 20, 2006 (JP) .............................. P2006-342718

(51) Int. Cl.
*H04N 7/18* (2006.01)
*H04N 9/47* (2006.01)
(52) U.S. Cl. ............. 348/61; 348/77; 348/135; 348/136
(58) Field of Classification Search ........................ None
See application file for complete search history.

(56) References Cited

U.S. PATENT DOCUMENTS

| 5,130,735 | A | * | 7/1992 | Kusaka et al. ................ 396/104 |
| 5,155,581 | A | * | 10/1992 | Tanaka et al. ............. 348/225.1 |
| 5,594,469 | A | * | 1/1997 | Freeman et al. .............. 345/158 |
| 6,124,891 | A | * | 9/2000 | Homma et al. ............... 348/364 |
| 6,160,899 | A | * | 12/2000 | Lee et al. ........................ 382/103 |
| 6,191,773 | B1 | * | 2/2001 | Maruno et al. ................ 345/158 |
| 6,208,385 | B1 | * | 3/2001 | Konishi et al. ................ 348/558 |
| 6,498,628 | B2 | * | 12/2002 | Iwamura ........................ 348/734 |
| 6,501,515 | B1 | * | 12/2002 | Iwamura ........................ 348/734 |
| 6,771,277 | B2 | * | 8/2004 | Ohba ............................ 345/629 |
| 7,084,884 | B1 | * | 8/2006 | Nelson et al. ................. 345/619 |
| 7,136,581 | B2 | * | 11/2006 | Fujii ................................ 396/54 |
| 7,148,909 | B2 | * | 12/2006 | Yui et al. ....................... 345/660 |
| 7,627,139 | B2 | * | 12/2009 | Marks et al. .................. 382/103 |
| 7,629,959 | B2 | * | 12/2009 | Kitaura ......................... 345/156 |
| 7,639,233 | B2 | * | 12/2009 | Marks ........................... 345/156 |
| 7,999,843 | B2 | * | 8/2011 | Ohba et al. ..................... 348/41 |
| 2001/0046381 | A1 | * | 11/2001 | Ichikawa et al. ................ 396/2 |
| 2004/0227817 | A1 | * | 11/2004 | Oya et al. ...................... 348/155 |
| 2006/0061548 | A1 | * | 3/2006 | Kitaura ......................... 345/156 |
| 2007/0003913 | A1 | * | 1/2007 | Rosenberg .................... 434/156 |
| 2007/0040033 | A1 | * | 2/2007 | Rosenberg .............. 235/462.36 |

(Continued)

FOREIGN PATENT DOCUMENTS

JP 06311508 A 11/1994
JP 2006-091948 4/2006

*Primary Examiner* — David England
(74) *Attorney, Agent, or Firm* — The Nath Law Group; Jerald L. Meyer; Stanley N. Protigal

(57) ABSTRACT

An electronic appliance has a video camera for picking up an image of a user of the electronic appliance. The user's image is displayed on a display of the electronic appliance. To adjust the size of the user's image on the display, a measurement zone having a first area is defined on the display. The user holds his or her hand so that the hand is displayed on the measurement zone. A control information determination unit or a CPU generates information indicative of the ratio of the area of the hand in the measurement zone to the area of the measurement zone. According to the generated information, the CPU controls an image adjuster that optimizes the size and position of the user's image on the display.

7 Claims, 18 Drawing Sheets

U.S. PATENT DOCUMENTS

| | | | |
|---|---|---|---|
| 2007/0064140 A1* | 3/2007 | Kitaura | 348/333.01 |
| 2007/0132725 A1* | 6/2007 | Kitaura | 345/156 |
| 2007/0279485 A1* | 12/2007 | Ohba et al. | 348/41 |
| 2008/0062125 A1* | 3/2008 | Kitaura | 345/157 |
| 2008/0088588 A1* | 4/2008 | Kitaura | 345/158 |
| 2008/0151045 A1* | 6/2008 | Kida et al. | 348/61 |
| 2008/0151092 A1* | 6/2008 | Vilcovsky | 348/333.01 |
| 2009/0144664 A1* | 6/2009 | Kramer et al. | 715/852 |

* cited by examiner

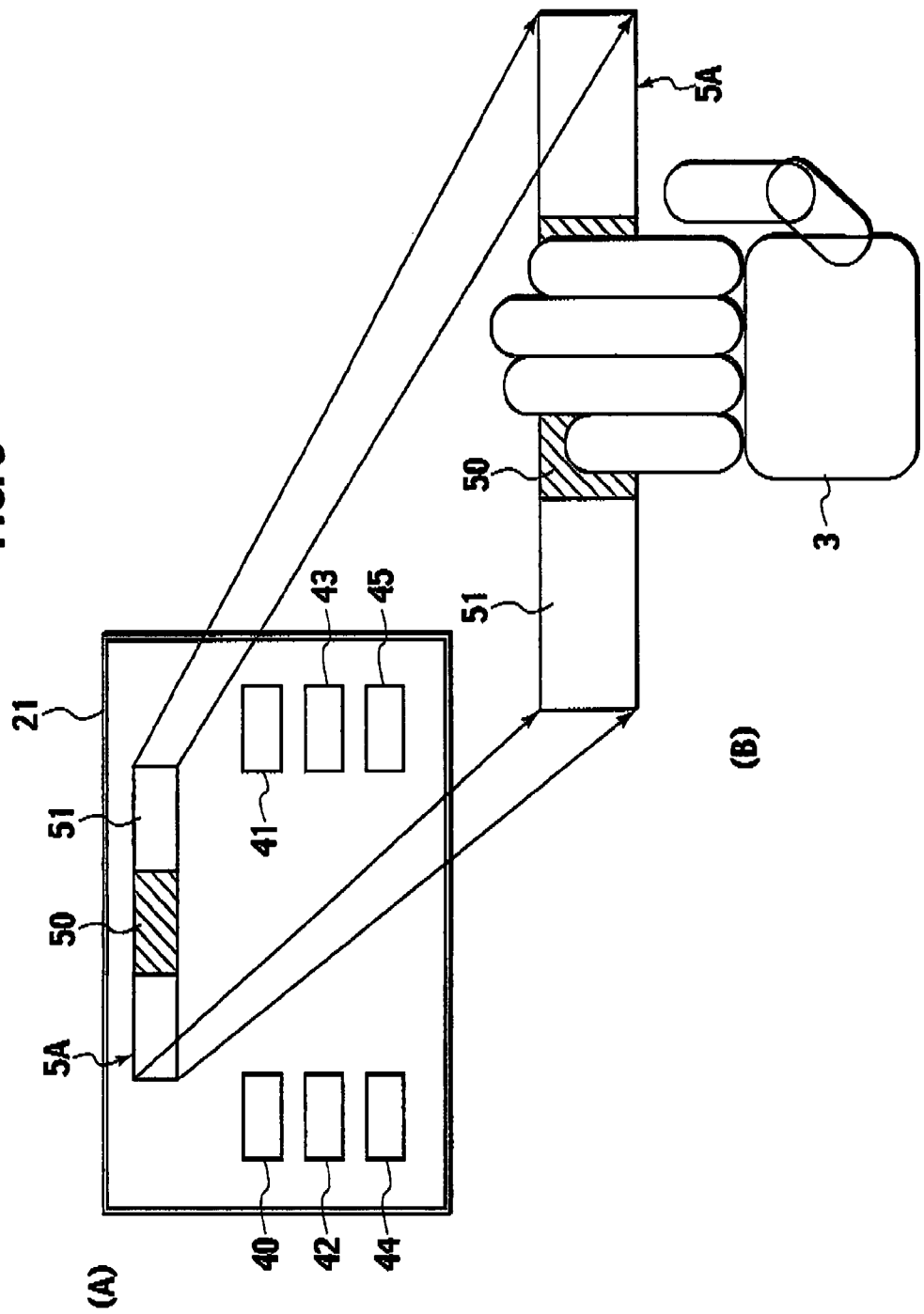

ELECTRONIC APPLIANCE

BACKGROUND OF THE INVENTION

1. Field of the Invention

The present invention relates to an electronic appliance, and particularly, to an electronic appliance having a display, such as a television set and a personal computer, provided with an improved remote control function.

2. Description of Related Art

In the 1980s, infrared remote controllers started to be attached to home appliances such as television sets. The remote controllers have widely accepted and greatly changed the usage of home appliances. At present, controlling electronic appliances with the remote controllers is in the mainstream. The remote controller basically employs a one-key (one-button), one-function operation. A remote controller for the television set, for example, has ON/OFF, CHANNEL, VOLUME, and INPUT SELECT keys for conducting respective functions. The remote controller is very useful for remotely controlling the television set and electronic devices connected to the television set.

Data broadcasting that has started recently requires a remote controller to be provided with UP, DOWN, LEFT, RIGHT, and OK keys, and the user must push these keys several times to display a necessary menu. Manipulating a number of keys is troublesome for the user. An EPG (electronic program guide) displays a matrix of guides on the television set and prompts the user to select a desired one of the guides by pushing keys on the remote controller. This is also troublesome for the user.

A related art proposed by this applicant in Japanese Unexamined Patent Application Publication No. 2006-091948 discloses a remote-control technique that uses no remote controller at hand and is flexibly applicable to a variety of electronic apparatuses. This technique employs a video camera to photograph the hand of a user moved with respect to a control button displayed on a display, and according to the hand's movement, identifies a control operation assigned to the control button.

This related art is capable of correctly detecting a hand motion of the user carried out with respect to a control button displayed on a display. The related art, however, is not good at resizing and positioning an image of the user's hand photographed by the video camera so that the hand's image may fit the size and position of the control button on the display. If the size and position of the hand's image on the display is improper to those of the control button, the user will feel inconvenience when manipulating the control button.

SUMMARY OF THE INVENTION

An object of the present invention is to provide an electronic appliance capable of allowing a user of the electronic appliance to surely operate a control button displayed on the electronic appliance without regard to the position of the user.

In order to accomplish the object, a first aspect of the present invention provides an electronic appliance 1 including a video camera 2 configured to photograph an operator 3 who is in front of the video camera and operates the electronic appliance, and obtain an operator's image; a mirror image converter 13 configured to convert the operator's image provided by the video camera into a mirror image; an image adjuster 14 configured to adjust the size of the operator's image provided by one of the video camera and mirror image converter; a display 21 configured to display the operator's image provided by the image adjuster; a measurement zone 51 (53, 55) having a first area, the measurement zone being used to adjust the size of the operator's image on the display, the operator overlaying an object so that an image of the object is displayed in the measurement zone; a generator 18 configured to generate information indicative of the ratio of an area of the object's image in the measurement zone to the first area; and a controller 18 configured to control the image adjuster according to the information provided by the generator so that the image adjuster optimizes the size of the operator's image on the display.

According to a second aspect of the present invention, the electronic appliance of the first aspect further includes an operational image generator 15 configured to generate an operational image including a control button 50 to be superimposed on the measurement zone; a mixer 16 configured to mix the operational image with the operator's image from the image adjuster into a mixed image; and a first detector (one of 171 to 17n) configured to generate a first detection signal from an image signal representative of an operation that is conducted by the operator with the object with respect to a first detection zone 500 that corresponds to the control button. In response to the first detection signal, the controller controls the image adjuster so that the image adjuster optimizes the size of the operator's image on the display.

According to a third aspect of the present invention, the electronic appliance of the first aspect further includes an extractor (30, 31) configured to extract, from the operator's image, a partial image corresponding to a second detection zone that agrees with the measurement zone; and a second detector (32) configured to generate, according to the partial image, a second detection signal indicative of an area ratio of the object. The controller controls the image adjuster according to the second detection signal.

According to a fourth aspect of the present invention, the electronic appliance of the first aspect further includes a move controller (12, 18) configured to sequentially move a third detection zone (54) through the measurement zone in a predetermined time, the third detection zone having a second area that is smaller than the first area of the measurement zone; an extractor (30, 31) configured to extract, from the operator's image, a partial image corresponding to the measurement zone when the move controller moves the third detection zone through the measurement zone; and a second detector (32) configured to generate, according to the partial image, a second detection signal indicative of an aria ratio of the object. The controller controls the image adjuster according to the second detection signal.

According to a fifth aspect of the present invention that is based on the fourth aspect, the second detection signal includes information indicative of a position of the object in the measurement zone; and the image adjuster moves the operator's image on the display according to the second detection signal.

According to a sixth aspect of the present invention that is based on the fourth aspect, the measurement zone includes an initial measurement zone 551 through which the third detection zone is initially moved and a reserve zone 552 adjoining the initial measurement zone; the second detection signal generated by the second detector includes positional information indicative of a position of the object in the measurement zone; and the electronic appliance further includes a zone controller 18 configured to shift, according to the positional information, a zone through which the third detection zone is moved from the initial measurement zone to a zone 553 that is in the measurement zone including the initial measurement zone and reserve zone and is optimum for the object.

The electronic appliance according to any one of these aspects of the present invention can surely detect an operation conducted by the user 3 with respect to the control button 50 displayed on the display 21 without regard to the location of the user 3.

The nature, principle and utility of the invention will become more apparent from the following detailed description when read in conjunction with the accompanying drawings.

BRIEF DESCRIPTION OF THE DRAWINGS

In the accompanying drawings:

FIG. 5 is a view showing a zoom button 5A according to Embodiment 1 of the present invention;

DETAILED DESCRIPTION OF EMBODIMENTS

Figure 1:
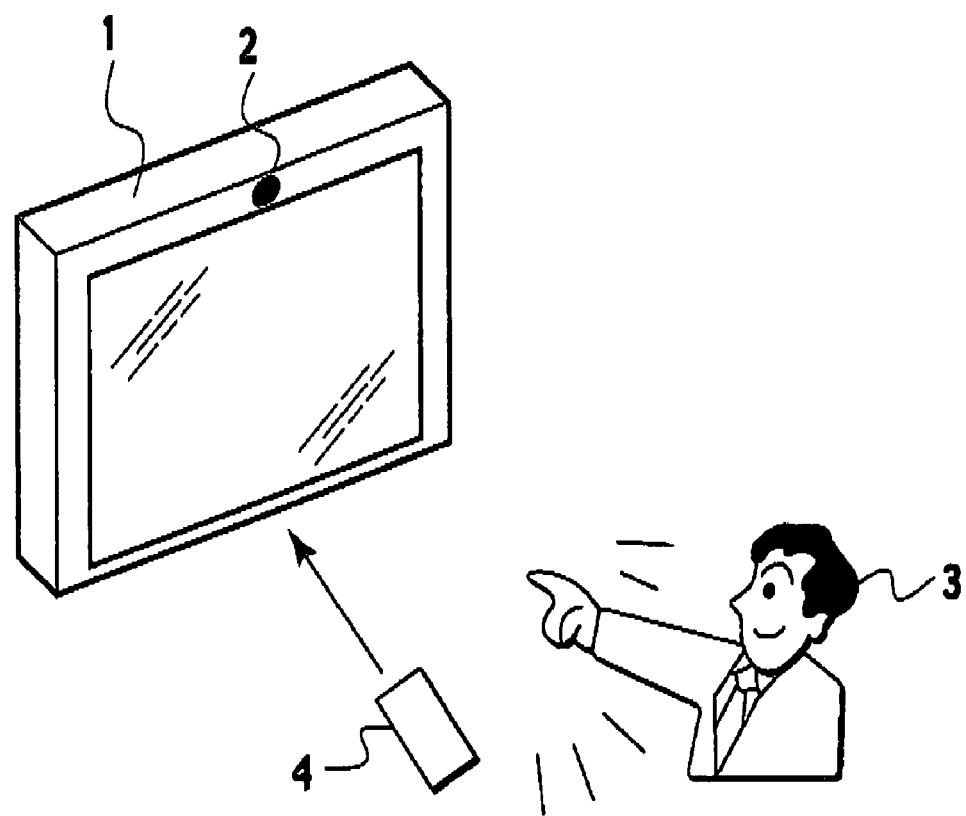
FIG. 1 is a view roughly explaining operation of an electronic appliance according to an embodiment of the present invention.

FIG. 1 shows a difference between an operation using a remote controller according to a related art and an operation according to the present invention. A user (operator) 3 operates a television set 1 serving as an example of an electronic appliance.

According to the related art, the user 3 must hold the remote controller 4, direct the remote controller 4 toward the television set 1, and push a key of required function on the remote controller 4 to control the television set 1. If the remote controller 4 is not present nearby, the user 3 is unable to control the television set 1, and therefore, must feel inconvenience.

On the other hand, the present invention provides the television set 1 with a video camera 2. The video camera 2 photographs the user 3. From an image of the user 3 provided by the video camera 2, a motion of the user 3 is detected and a control operation corresponding to the detected motion is carried out with respect to the television set 1 or any other device connected to the television set 1.

A motion of the user 3 to be detected is a motion of the body (hand, foot, face, and the like) of the user 3 intended to select a necessary one of buttons in a menu displayed on the television set 1. Embodiments of the present invention mentioned below use hand motions to control an electronic appliance. If an environment of the television set 1 is dim, a remote control device (handy controller) having a light emitting function may be employed to carry out a motion equivalent to a hand motion.

Figure 2:
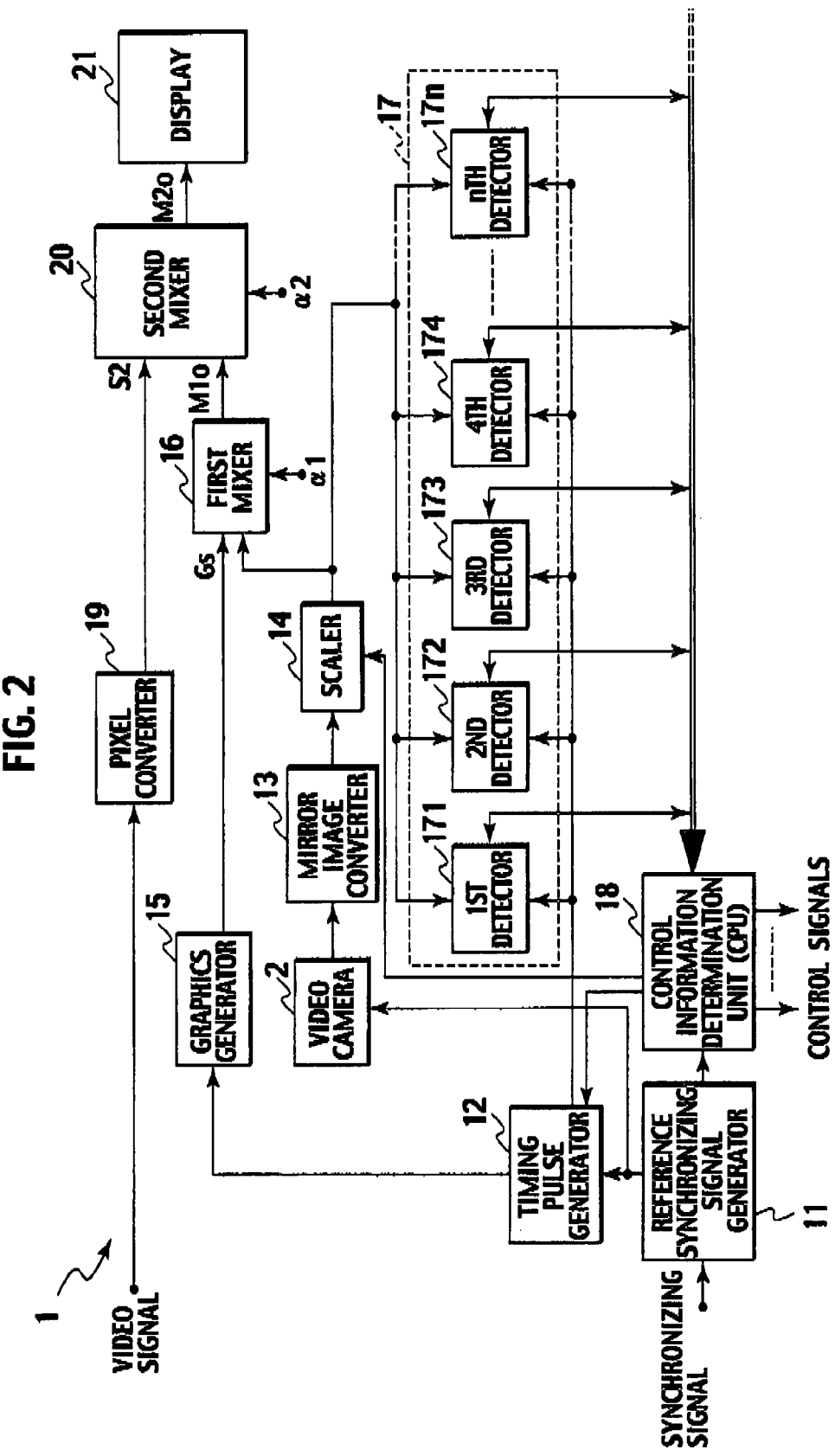
FIG. 2 is a block diagram showing parts of an electronic appliance (television set 1) according to an embodiment of the present invention.

FIG. 2 is a block diagram showing examples of parts in a television set 1 according to an embodiment of the present invention. The television set 1 has a video camera 2, a reference synchronizing signal generator 11, a timing pulse generator 12, a mirror image converter 13, a scaler 14, a graphics generator 15, a first mixer 16, a detection unit 17, a control information determination unit (realized by a CPU, and therefore, hereinafter referred to as CPU) 18, a pixel converter 19, a second mixer 20, and a display 21.

The reference synchronizing signal generator 11 generates, based on input synchronizing signals, horizontal periodic pulses and vertical periodic pulses as reference signals for the television set 1. The input synchronizing signals are contained in video signals supplied to the pixel converter 19. When receiving television broadcasting signals or video signals from an external device, the generator 11 generates pulses synchronized with synchronizing signals contained in the received signals. The timing pulse generator 12 generates pulses having optional phases and widths in horizontal and vertical directions for the respective parts shown in FIG. 2.

The video camera 2 is arranged at a front part of the television set 1 as shown in FIG. 1 and photographs the user (operator) 3 or an object in front of the television set 1. The video camera 2 outputs a brightness signal (Y) and color difference signals (R-Y, B-Y) in synchronization with the horizontal and vertical periodic pulses provided by the reference synchronizing signal generator 11.

The mirror image converter 13 horizontally flips an image (of the user 3) photographed by the video camera 2 into a mirror image, which is displayed on the display 21. If the video camera 2 provides an image of a character, it is horizontally inverted like a character image reflected from a mirror. This embodiment employs memories to horizontally flip an image into a mirror image. If the display 21 is a CRT (cathode ray tube), a horizontal deflecting operation may be reversely carried out to horizontally invert an image into a mirror image. In this case, other images or graphics to be mixed with an image from the video camera 2 must be horizontally inverted in advance.

The scaler 14 adjusts (enlarges or reduces) the size of the image photographed by the video camera 2. Under the control of the CPU 18, the scaler 14 two-dimensionally adjusts an expansion ratio or a contraction ratio of a given image.

Instead of expansion or contraction, the scaler 14 may adjust the horizontal and vertical phases of a given image.

According to the embodiment, the scaler 14 is arranged after the mirror image converter 13 and adjusts a mirror image provided by the mirror image converter 13. The scaler 14 may be arranged between the video camera 2 and the mirror image converter 13, to adjust an image provided by the video camera 2.

The graphics generator 15 forms a menu (an operational image) according to a menu signal transferred from the CPU 18. If the menu signal is a primary color signal involving R (red), G (green), and B (blue) signals, the graphics generator 15 generates, from the primary color signal, a Y (brightness) signal and color difference (R-Y, B-Y) signals, which are synthesized or mixed with an image signal in a later stage. The number of planes of the generated graphics is optional. In this embodiment, the number of planes is one.

The number of pixels of the generated graphics according to the embodiment is equal to the number of pixels of the display 21. If they are not equal to each other, a pixel converter will be arranged in or after the graphics generator 15 to equalize the pixel numbers.

The first mixer 16 mixes an output signal Gs of the graphics generator 15 with an output signal S1 of the scaler 14 according to a control value $\alpha 1$ that controls a mixing ratio. The first mixer 16 provides an output signal M1o as follows:

$$M1o = \alpha 1 \times S1 + (1-\alpha 1) \times Gs \quad (1)$$

The control value $\alpha 1$ is set between 0 and 1. As the control value $\alpha 1$ increases, a proportion of the scaler output signal S1 increases and a proportion of the output signal Gs of the graphics generator 15 decreases. This configuration of the mixer does not limit the present invention. The present invention is achievable with any mixer that receives two systems of signal information. If the scaler 14 is arranged between the video camera 2 and the mirror image converter 13, a signal provided by the mirror image converter 13 may be used as the output signal S1.

The detection unit 17 includes a first detector 171, a second detector 172, ..., and an "n"th detector 17n. The number of detectors in the detection unit 17 is dependent on the number of control buttons contained in the menu provided by the graphics generator 15. Control buttons in the menu are associated with control operations to be carried out with respect to the television set 1 or any other device connected to the television set 1.

The CPU (or control information determination unit) 18 analyzes data (detection signals) provided by the detection unit 17 and outputs various control signals. Based on data from the detection unit 17, the CPU 18 generates a control signal corresponding to a manipulated one of the push buttons of the menu, to control a corresponding part of the television set 1. The CPU 18 employs software to conduct various operations. Algorithms of the software will be explained later. To carry out various operations, the embodiment employs hardware (functional blocks) and software (in the CPU 18). Classification of the operations into hardware executable operations and software executable operations is not essential for the present invention.

The pixel converter 19 converts pixel counts, to equalize the number of pixels of an external input signal with the number of pixels of the display 21. The external input signal is a signal coming from the outside of the television set 1, such as a broadcasting television signal (including a data broadcasting signal) received by a built-in tuner (not shown) or a video (VTR) signal. From the external input signal, horizontal and vertical synchronizing signals are extracted, and the reference synchronizing signal generator 11 synchronizes the respective parts of the television set 1 based on the horizontal and vertical synchronizing signals.

The second mixer 20 functions like the first mixer 16. The second mixer 20 mixes the output signal M1o of the first mixer 16 with an output signal S2 of the pixel converter 19 at a control value $\alpha 2$ that controls a mixing ratio. The second mixer 20 provides an output signal M2o as follows:

$$M2o = \alpha 2 \times M1o + (1-\alpha 2) \times S2 \quad (2)$$

The control value $\alpha 2$ is set between 0 and 1. As the control value $\alpha 2$ increases, a proportion of the output signal M1o from the first mixer 16 increases and a proportion of the output signal S2 from the pixel converter 19 decreases. The mixer 20 is not limited to the above-mentioned configuration. The mixer 20 may employ any configuration that receives two systems of signal information.

The display 21 may be a CRT, an LCD (liquid crystal display), a PDP (plasma display panel), a projection display, or the like. The display 21 may employ any proper display method. The display 21 receives a brightness signal Y and color difference signals R-Y and B-Y, converts them into R, G, and B primary color signals, and displays an image according to the signals.

Figure 3:
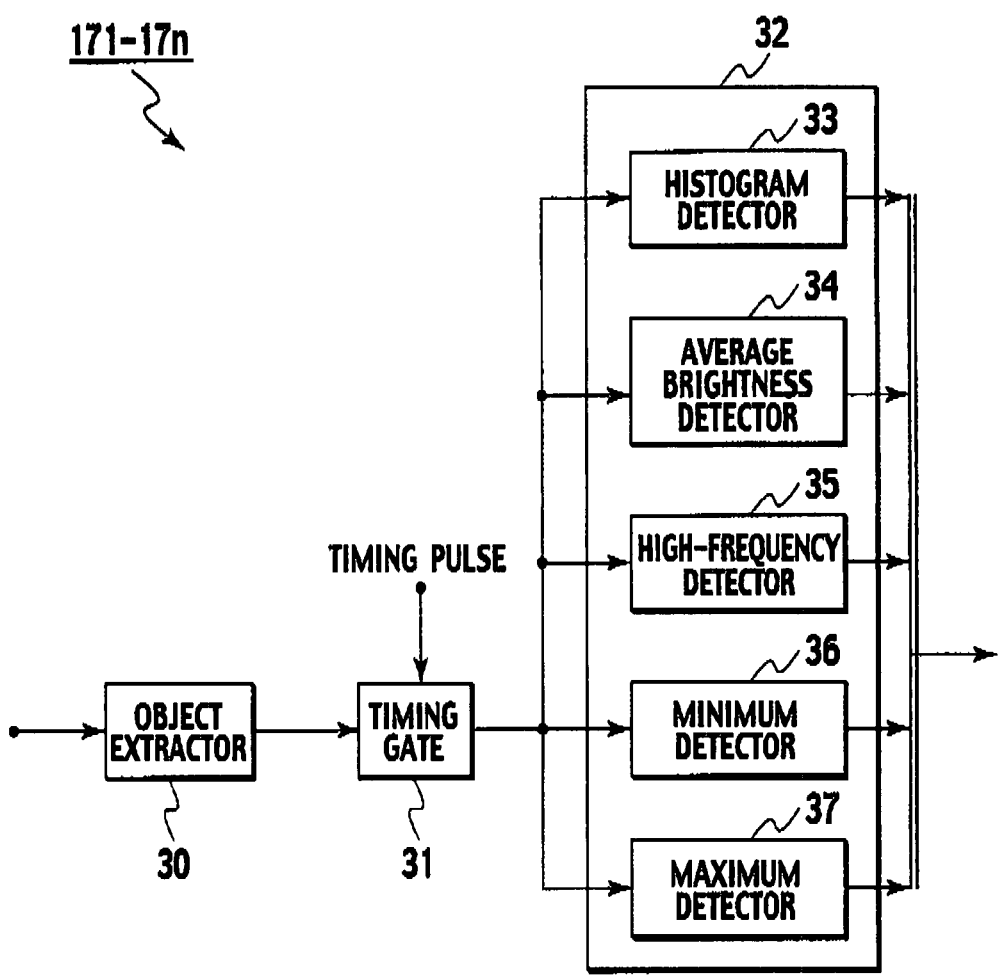
FIG. 3 is a block diagram showing one of detectors shown in FIG. 2.

FIG. 3 shows one of the detectors 171 to 17n. Each detector includes an object extractor 30, a timing gate 31, and a feature detector 32. The object extractor 30 has filters for filtering the characteristics of an object and provides the timing gate 31 with a filtered image signal.

In response to timing pulses, the timing gate 31 passes an image signal representative of a specified one of detection zones to be explained later. For the image signal representative of the specified detection zone, the feature detector 32 carries out various filtering processes to extract an image of the hand of the user 3 photographed by the video camera 2.

The feature detector 32 includes functional blocks to detect various characteristics from the image signal representative of the hand (object) of the user 3. According to an embodiment of the present invention, the feature detector 32 includes a histogram detector 33, an average brightness (average picture level (APL)) detector 34, a high-frequency detector 35, a minimum detector 36, and a maximum detector 37. An image has various characteristics. According to an embodiment of the present invention, detection signals generated by the detectors 33 to 37 are used by the CPU 18 to identify the hand and recognize a motion of the hand.

Figure 4:
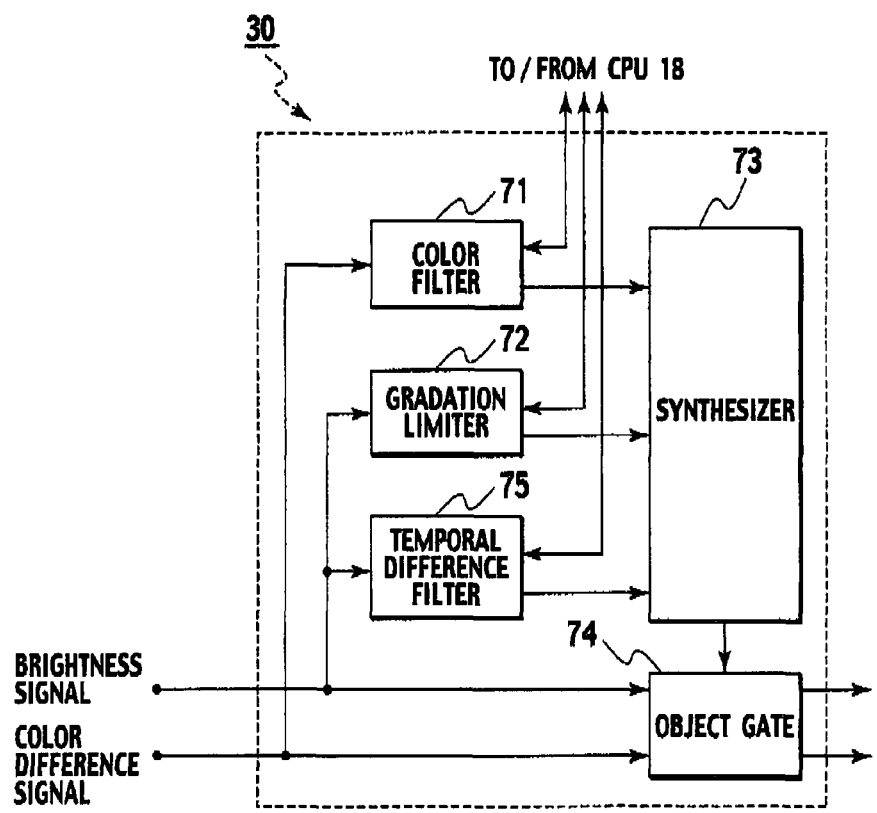
FIG. 4 is a block diagram showing an object extractor in the detector of FIG. 3.

FIG. 4 is a block diagram showing the details of the object extractor 30. The object extractor 30 carries out filtering processes to detect a hand of the user 3. For this, the object extractor 30 has a color filter 71, a gradation limiter 72, a temporal difference filter 75, a synthesizer 73, and an object gate 74.

The color filter 71, gradation limiter 72, and temporal difference filter 75 are used to identify the characteristics of an object, i.e., a hand. The color filter 71 limits the hue and color depth (degree of saturation) of a color signal consisting of color difference signals. The gradation limiter 72 limits a specific gradation range in a brightness signal. The temporal difference filter 75 extracts a hand area according to a slight brightness difference between the hand and a background of the hand even if the background has a color similar to the color of the hand. According to an embodiment of the present invention, a human hand is an object that manipulates a control button in a menu and is to be detected. The object extractor 30 can detect not only a human hand but also any object that manipulates a control button by adjusting and optimizing the hue and gradation parameters used by the object extractor 30.

The synthesizer 73 receives signals from the color filter 71, gradation limiter 72, and temporal difference filter 75 and synthesizes the received signals into an intraregional pulse. This intraregional pulse will be high if signals passed through the color filter 71, gradation limiter 72, and temporal difference filter 75 are all high (AND). It is possible to make the intraregional pulse high if there is one or two high-level signals passed through the color filter 71, gradation limiter 72, and temporal difference filter 75.

If the intraregional pulse is set to high when there are two high-level signals passed through the color filter 71, gradation limiter 72, and temporal difference filter 75, erroneous detection will be prevented. If the intraregional pulse is set to high when there are three high-level signals passed through the color filter 71, gradation limiter 72, and temporal difference filter 75, erroneous detection will more surely be prevented.

The intraregional pulse from the synthesizer 73 is supplied to the object gate 74. If the intraregional pulse is high, the object gate 74 passes the brightness and color difference signals. If the intraregional pulse is low, the object gate 74 blocks the brightness and color difference signals and outputs signals of predetermined values. According to the embodiment, the signals of predetermined values are a black-level brightness signal and color difference signals of saturation degree of zero.

Embodiment 1

Embodiment 1 according to the present invention will be explained. This embodiment relates to a zooming function realized by the electronic appliance (television set 1) shown in FIGS. 2 to 4, to control the size of an image of the user 3 displayed on the display 21.

In FIG. 5, a view (A) shows the display 21 displaying an operational image generated by the graphics generator 15 shown in FIG. 2. The operational image includes a zoom button 5A. The zoom button 5A consists of a control button 50 for activating the zooming function and a measurement zone 51 that is larger than the control button 50 in horizontal directions. The control button 50 is superimposed on the measurement zone 51. The operational image also includes menu buttons 40 to 45 corresponding to control operations of the television set 1.

The control button 50 activates the zooming function to be carried out with respect to an image provided by the video camera 2. The measurement zone 51 is used to find the ratio of an image of a hand overlaid on the zoom button 5A. According to Embodiment 1, the measurement zone 51 is invisible to the user 3. The zoom button 5A must be positioned so that it can easily be manipulated by the user 3 wherever the user 3 is. For example, the zoom button 5A is positioned at an upper center part or a center part of the display 21 as shown in the view (A) of FIG. 5.

In FIG. 5, a view (B) shows an image of a hand of the user 3 overlaid on the control button 50.

The first mixer 16 of FIG. 2 mixes the operational image shown in the view (A) of FIG. 5 with an image processed through the mirror image converter 13 and scaler 14 according to a mixing ratio specified by the control value α1.

The mirror-converted-and-scaled image from the mirror image converter 13 and scaler 14 includes detection zones corresponding to the detectors 171 to 17n of the detection unit 17, respectively. These detection zones correspond to the control button 50, measurement zone 51, and menu buttons 40 to 45, respectively. Namely, the detection zones in the mirror-converted-and-scaled image positionally agree with the menu buttons 40 to 45, control button 50, and measurement zone 51 in the operational image shown in the view (A) of FIG. 5. The detection zone corresponding to the control button 50 is a detection zone 500 and the detection zone corresponding to the measurement zone 51 is a detection zone 52.

The detection unit 17 provides the CPU 18 with detection data representative of an object (the hand of the user 3) detected in the detection zones corresponding to the buttons 40 to 45 and 50 and measurement zone 51.

Figure 6A:
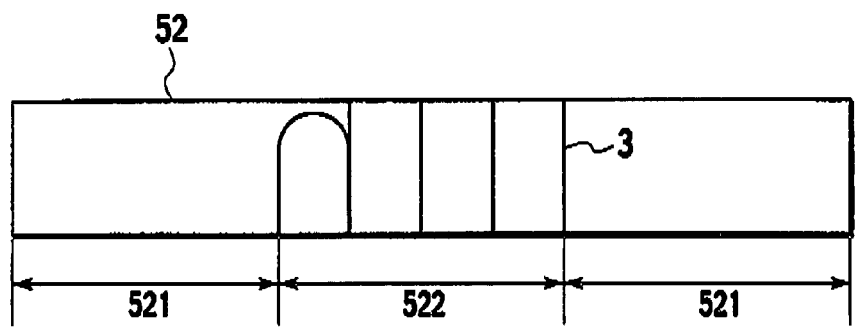
FIG. 6A is a view showing a hand on the zoom button 5A.

FIG. 6A explains the ratio of the area of the hand to the area of the detection zone 52 (measurement zone 51) when the user 3 holds the hand so that an image of the hand is superimposed on the zoom button 5A as shown in the view (B) of FIG. 5. The detector assigned to the detection zone 52 generates a detection signal indicative of the ratio of the hand area to the area of the measurement zone 51. An image of the detection zone 52 is extracted from the mirror-converted-and-scaled image by an extractor consisting of the object extractor 30 and timing gate 31 shown in FIG. 3 of the detector (one of the detectors 171 to 17n) assigned to the detection zone 52.

A part 522 of the detection zone 52 involves the hand, and therefore, produces brightness differences that are extracted by the object extractor 30 (temporal difference filter 75) as brightness and color difference signals. Parts 521 of the detection zone 52 where no hand is present produce no brightness difference, and therefore, the object extractor 30 provides a brightness signal of black level and color difference signals of zero saturation degree.

Figure 6B:
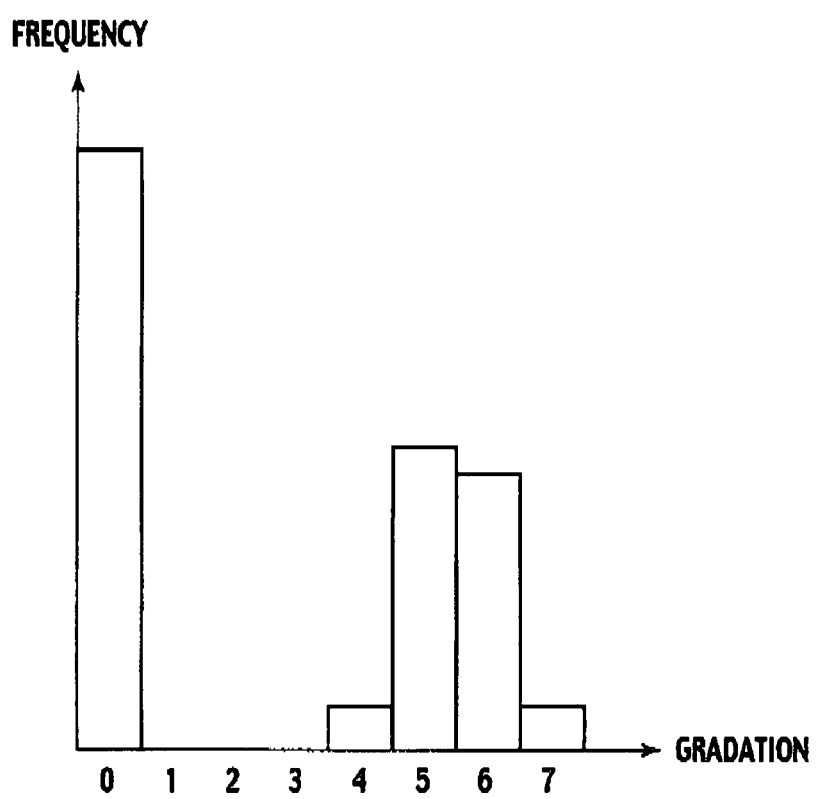
FIG. 6B is a histogram representative of the hand shown in FIG. 6A.

The image signal (brightness signal) provided by the object extractor 30 and limited by the timing gate 31 to the detection zone 52 is processed by the histogram detector 33 of the feature detector 32. After the processing, the histogram detector 33 provides a detection signal indicative of the ratio of a hand area in the detection zone 52 to the total area of the detection zone 52. The detection signal indicative of the hand area ratio may be provided by any other detector in the feature detector 32. FIG. 6B shows a frequency distribution or histogram of brightness representing the detection zone 52 of FIG. 6A. In FIG. 6B, an ordinate indicates the frequency of a given gradation level or brightness level and an abscissa indicates eight gradation or brightness levels ranging from level 0 to level 7. The frequency of a given gradation level is equal to the number of pixels having the given gradation level in the detection zone 52. In FIG. 6B, the gradation level 0 corresponds to the parts 521 of the detection zone 52 where no hand is detected, and the gradation levels 4 to 7 correspond to the part 522 of the detection zone 52 where the hand is detected.

The detection signal indicating a distribution of gradation levels corresponding to a hand area ratio is supplied from the histogram detector 33 to the CPU 18. Based on the detection signal, the CPU 18 provides information indicative of a hand ratio HR, i.e., the ratio of the area of the hand in the detection zone 52 to the total area of the detection zone 52. The hand ratio HR (%) is calculated as follows:

$$HR = \frac{\sum_{i=2}^{i=7} hist[i]}{\sum_{i=0}^{i=7} hist[i]} \times 100 \qquad (3)$$

where "hist[i]" is a histogram of gradation level "i." Although this embodiment calculates a hand ratio HR according to gradation levels 2 to 7, the present invention is not limited to this.

According to the information indicative of the hand ratio HR, the CPU 18 controls a parameter used by the scaler 14 and activates the zooming function of the scaler 14. The hand ratio HR is obtained from a hand image taken by the video camera 2 and is used to optimize the zooming function. Namely, the zooming function is optimized according to the actual size of a user's hand and is irrelevant to whether the user's hand is big or small. The present invention can optimize, on the display 21, the image of any hand such as an adult's hand and a child's hand.

Figure 7:
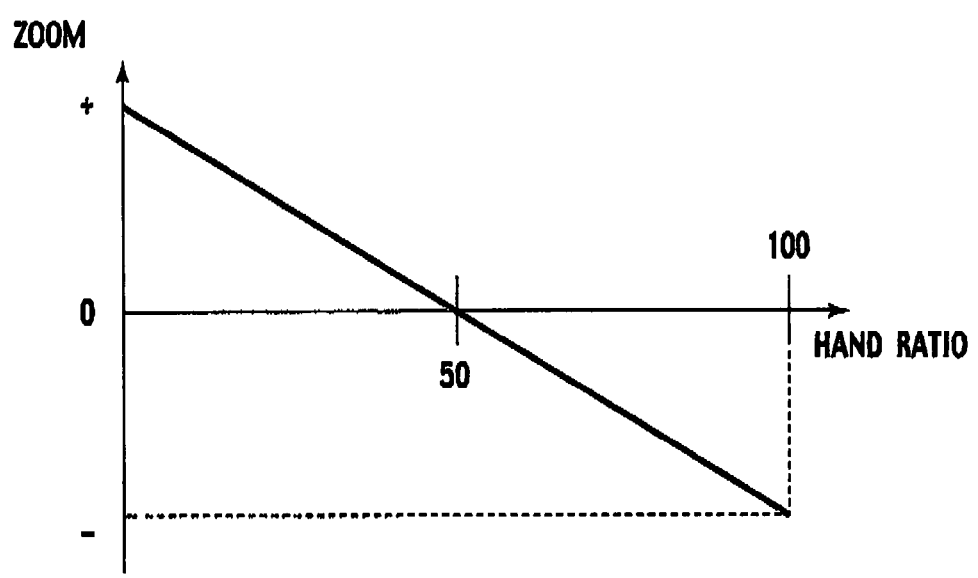
FIG. 7 is a graph showing a zoom parameter to be set for a scaler 14 shown in FIG. 2.

FIG. 7 shows a characteristic curve used by the CPU 18 to determine a zoom parameter for the zooming function of the scaler 14 according to the hand ratio HR. An ordinate represents a zoom magnitude or parameter set for the scaler 14 and an abscissa represents the hand ratio HR. As the hand ratio HR becomes smaller, the zoom magnitude becomes larger. As the hand ratio HR becomes larger, the zoom magnitude becomes smaller. If the hand ratio HR is 50%, it is determined that the user 3 is at an optimum position for controlling the electronic appliance (television set 1), and therefore, the zooming function is inactivated.

Figure 8:
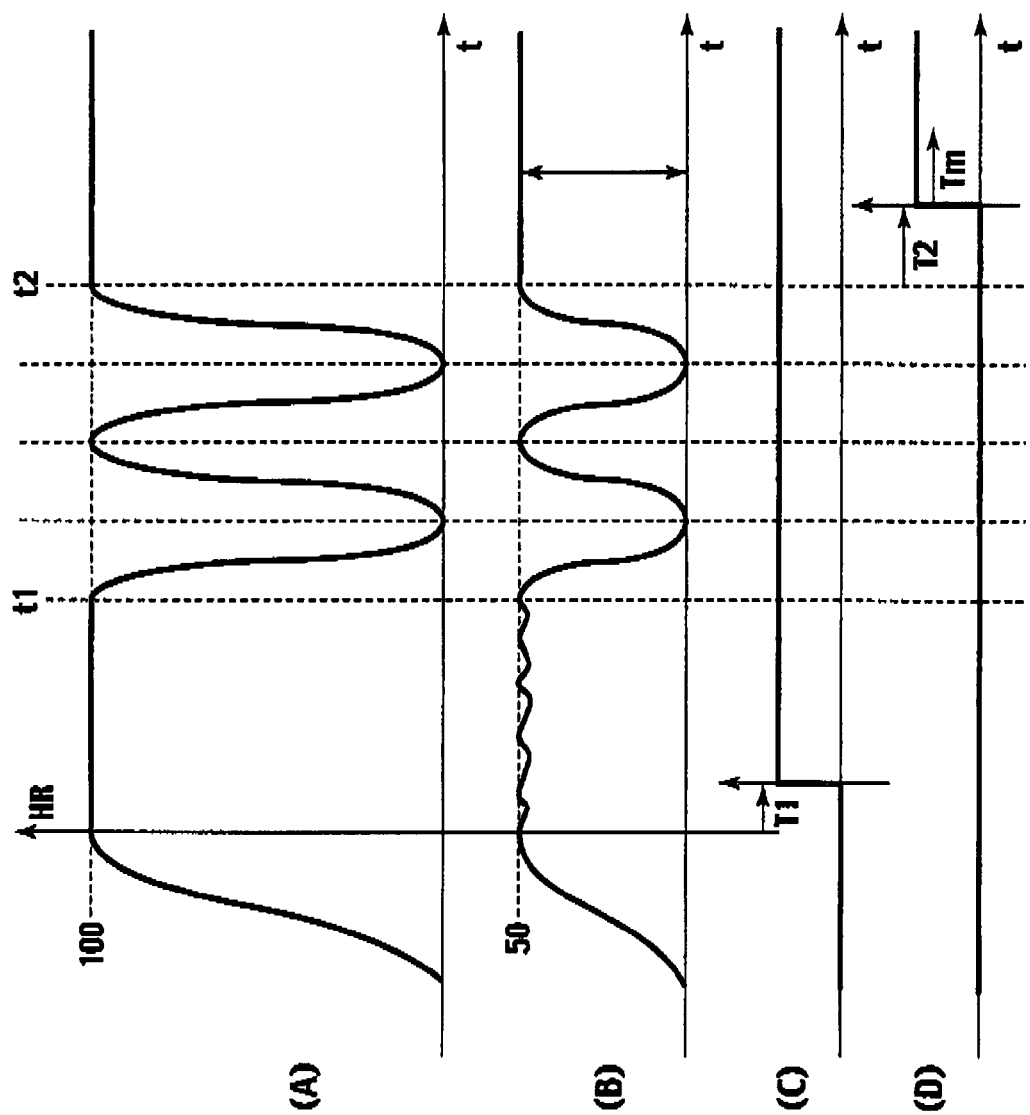
FIG. 8 is a graph showing the timing of controlling a zooming function of the scaler 14.

Timing of controlling the zooming function of the scaler 14 by the CPU 18 will be explained with reference to FIG. 8. In FIG. 8, a graph (A) has an ordinate representing a hand ratio HR of hand to detection zone 500 (control button 50) and an abscissa representing time. A graph (B) has an ordinate representing a hand ratio HR of hand to detection zone 52 (measurement zone 51) and an abscissa representing time. A graph (C) shows an activation flag and a time axis. A graph (D) shows a zoom determination flag and a time axis. The graphs (A) to (D) are on the same time axis. The hand ratio HR of hand to detection zone 500 is calculated according to the expression (3). The graphs (A) and (B) indicate that an image of the hand of the user 3 completely covers the control button 50 and about a half of the detection zone 52.

When a time constant T1 passes after the hand ratio HR of hand to detection zone 500 reaches 100% in the graph (A) and the hand ratio HR of hand to detection zone 52 reaches 50% in the graph (B), the activation flag rises as shown in the graph (C). In a period from t1 to t2 shown in the graph (A), the user 3 conducts a predetermined hand motion with respect to the control button 50. In response to the predetermined hand motion, the detector assigned to the detection zone 500 generates a detection signal based on an image signal from the detection zone 500. According to the detection signal, the CPU 18 determines that the control button 50 has been operated. Then, after a time constant T2, the zoom determination flag is raised as shown in the graph (D). The predetermined hand motion conducted by the user 3 with respect to the control button 50 is, for example, bending the fingers of the hand twice on the control button 50.

Raising the activation flag when the hand ratio HR of hand to detection zone 500 reaches 100% and the hand ratio HR of hand to detection zone 52 reaches 50% is only an example and does not limit the present invention. Any other thresholds may be set for raising the activation flag.

When the zoom determination flag rises to high as shown in the graph (D), the CPU 18 adjusts the size of the image of the user 3 displayed on the display 21. This will be explained in more detail.

The CPU 18 generates information indicative of an average of hand ratios concerning the detection zone 52 for a given number of frames after the time constant Tm. Based on the average hand ratio, the CPU 18 determines a zoom parameter (FIG. 7) used for the zooming function of the scaler 14. If the time constant Tm is equal to three frames after the zoom determination flag rises to high, the CPU 18 generates information indicative of an average of hand ratios concerning the detection zone 52 of the three frames. According to the average, the CPU 18 controls the zooming function of the scaler 14 so that the image of the user 3 is optimized on the display 21.

The CPU 18 may generate information indicative of an average hand ratio for a period from when the activation flag of the graph (C) of FIG. 8 rises to when the zoom determination flag rises excluding an interval from t1 to t2.

Embodiment 2

Embodiment 2 according to the present invention will be explained. This embodiment relates to a zooming function realized by the electronic appliance (television set 1) shown in FIGS. 2 to 4, to control the size of an image of the user 3 displayed on the display 21.

Figure 9:
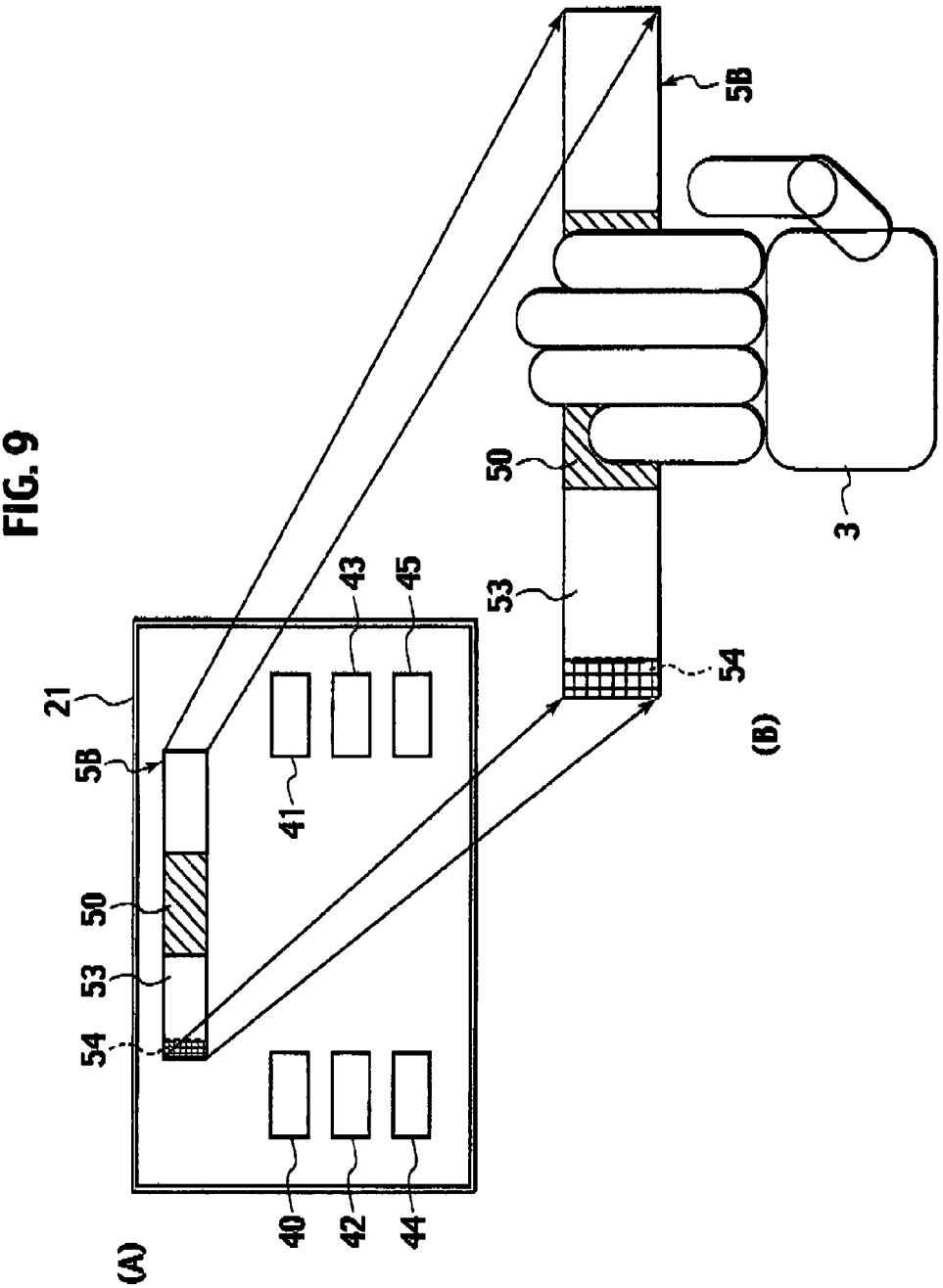
FIG. 9 is a view showing a zoom button 5B according to Embodiment 2 of the present invention.

A view (A) of FIG. 9 shows the display 21 displaying an operational image generated by the graphics generator 15 shown in FIG. 2. The operational image includes a zoom button 5. The zoom button 5B consists of a control button 50 for activating the zooming function and a scan zone 53. The control button 50 is superimposed on the scan zone 53. The operational image also includes menu buttons 40 to 45 corresponding to control operations of the television set 1. The scan zone 53 functions like the measurement zone 51 of Embodiment 1 and has the same size as the measurement zone 51.

The zoom button 5B must be positioned so that it can easily be manipulated by the user 3 wherever the user 3 is. For example, the zoom button 5B is positioned at an upper center part or a center part of the display 21. The scan zone 53 may be invisible to the user 3.

A view (B) of FIG. 9 shows an image of a hand of the user 3 superimposed on the control button 50.

As explained above, a mirror-converted-and-scaled image from the mirror image converter 13 and scaler 14 includes a detection zone 500 corresponding to the control button 50 and detection zones corresponding to the menu buttons 40 to 45. On the display 21, these detection zones positionally agree with the buttons 40 to 45 and 50 as shown in the view (A) of FIG. 9. In the mirror-converted-and-scaled image, a scanner 54 is set. The area of the scanner 54 is smaller than the area of the scan zone 53. The detection zones corresponding to the menu buttons 40 to 45, the detection zone 500, and the scanner 54 are detected by the detectors 171 to 17n of the detector unit 17, respectively.

The CPU 18 and timing pulse generator 12 serve as a move controller to change timing pulses supplied to the timing gate 31 shown in FIG. 3, so that the scanner 54 is sequentially moved through the scan zone 53 in a predetermined time. Moving the scanner 54 through the scan zone 53 results in making the extractor (the object extractor 30 and timing gate 31) extract an image signal representative of the scan zone 53 from the image signal processed through the mirror image converter 13 and scaler 14. The scanner 54 is invisible to the user 3.

Figure 10:
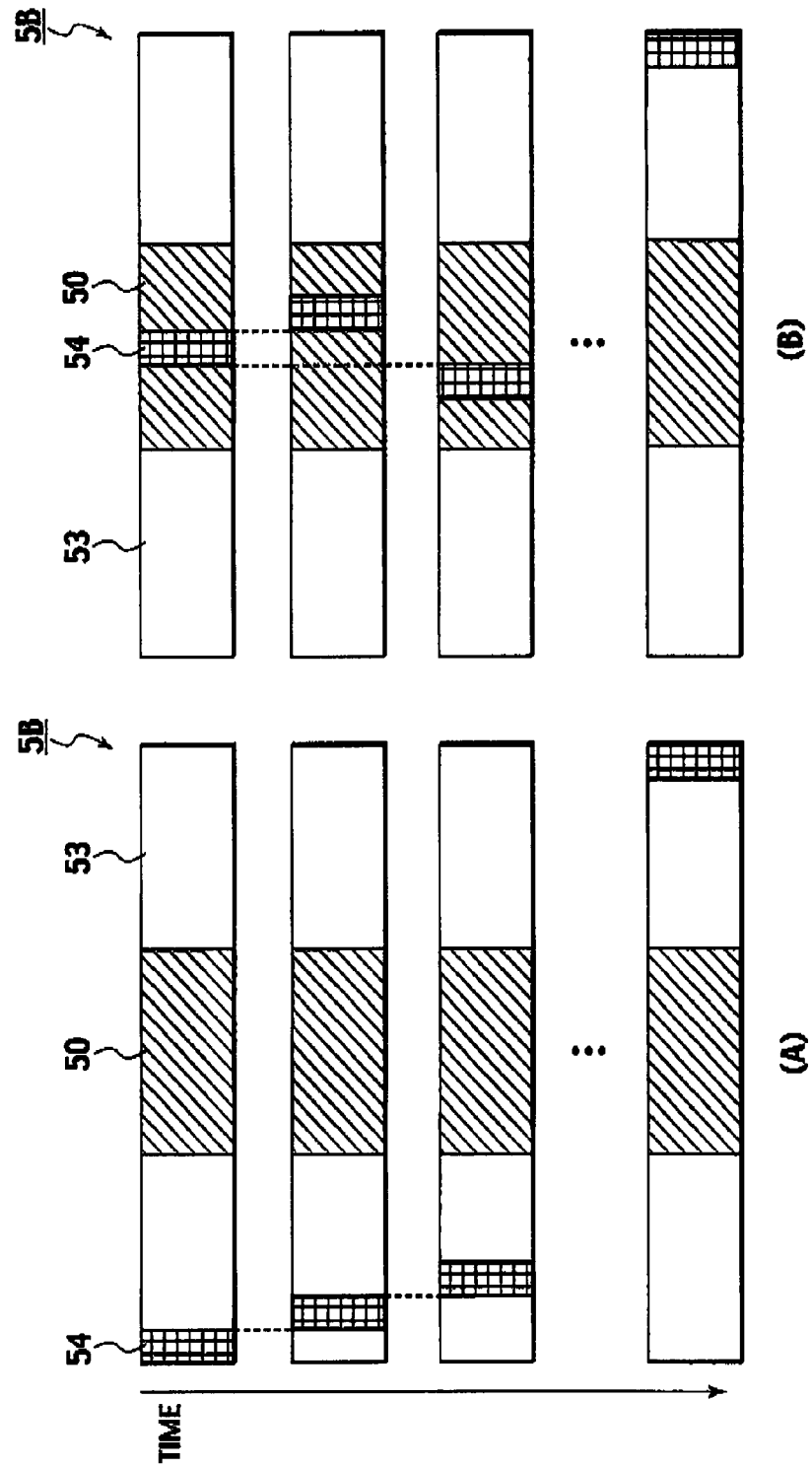
FIG. 10 is a view showing first and second scan techniques according to the present invention.

FIG. 10 shows first and seconds can techniques for moving the scanner 54 through the scan zone 53. A view (A) of FIG. 10 shows the first scan technique that moves the scanner 54 from a left end of the scan zone 53 to a right end thereof at intervals of vertical period. A view (B) of FIG. 10 shows the second scan technique that moves the scanner 54 from the center of the scan zone 53 to the left and right ends thereof at intervals of vertical period. In the views (A) and (B) of FIG. 10, the scan operation proceeds from the top to the bottom of each view.

The second scan technique moves the scanner 54 from around the center of the control button 50 on which the user 3 holds his or her hand. Accordingly, the second scan technique can more speedily detect a brightness difference caused by the hand in the scan zone 53 than the first scan technique. Each of the first and second scan techniques requires the user 3 to hold the hand on the control button 50 until the scanner 54 entirely scans the scan zone 53, and therefore, there is no difference in the hand holding time between the first and second scan techniques. Due to this, it is preferable to inform the user 3 of keeping his or her hand on the control button 50 until the scanning is finished, by displaying a message on the display 21, for example.

Figure 11:
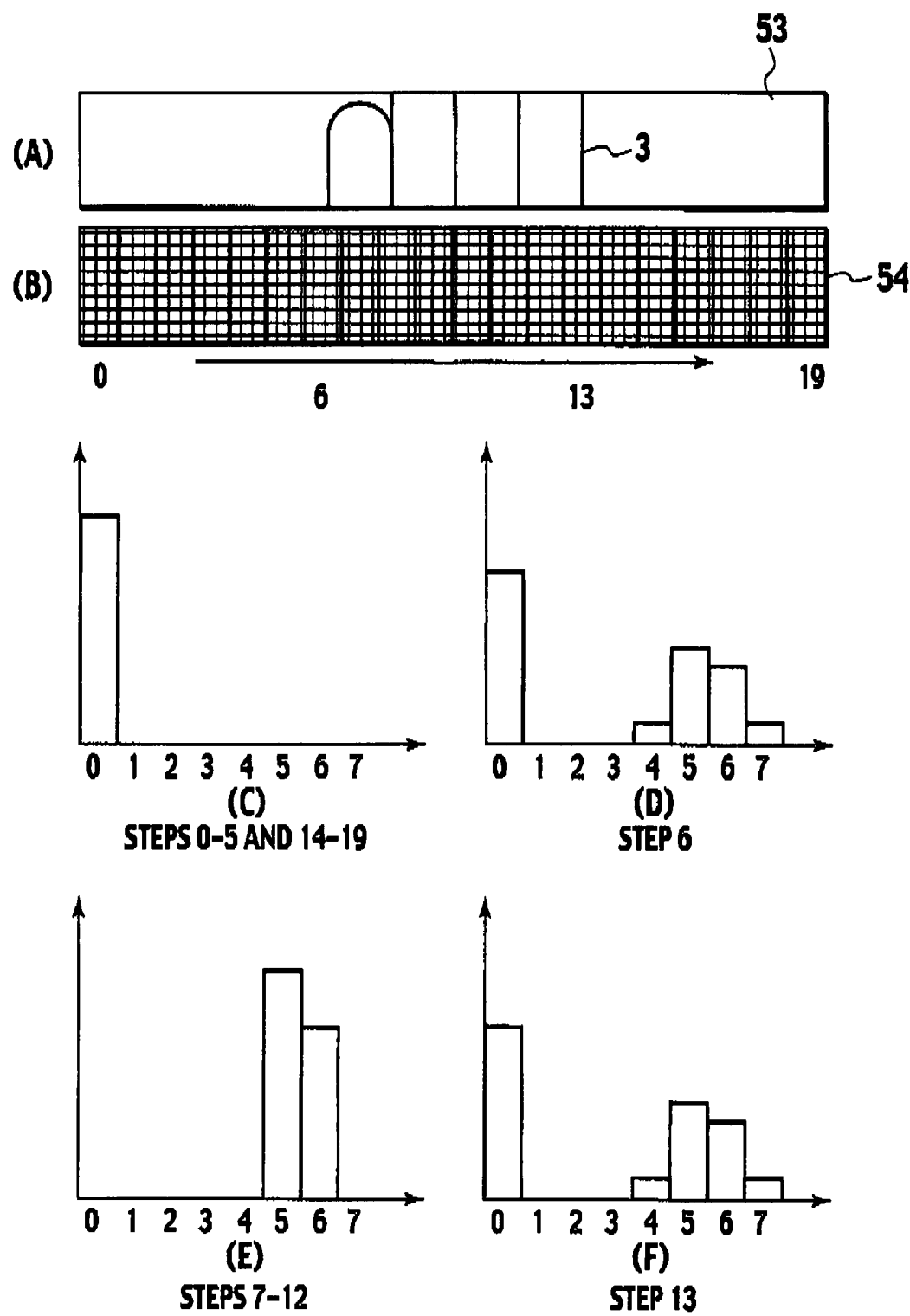
FIG. 11 is a view showing a hand on the zoom button 5B and histograms representative of the hand.

FIG. 11 shows the first scan technique scanning a hand projected on the scan zone 53. A view (A) of FIG. 11 shows the hand superimposed on the scan zone 53. This hand is an image extracted from an image signal provided through the mirror image converter 13 and scaler 14. A view (B) of FIG. 11 shows the scan zone 53 scanned with the scanner 54 in 20 steps from left to right (from step 0 to step 19). Views (C) to (F) of FIG. 11 show histograms in the steps. In the zoom button 5B, the control button 50 is arranged at the center of the scan zone 53. For the sake of easy understanding, the control button 50 is not shown in FIG. 11.

As shown in the view (B) of FIG. 11, the scanner 54 scans the scan zone 53 in 20 steps. A period in which the scanner 54 entirely scans the scan zone 53 in 20 steps is referred to as one scan period.

The view (C) of FIG. 11 is a histogram provided by each of the steps 0 to 5 and 14 to 19 of the scan zone 53. At each of the steps 0 to 5 and 14 to 19, the scanner 54 detects no hand in the scan zone 53, and therefore, the scanner 54 finds no brightness difference in the scan zone 53. As a result, the object extractor 30 in the detector (one of the detectors 171 to 17n) assigned to the scanner 54 provides a brightness signal of black level and color difference signals of zero saturation degree, and therefore, the histogram detector 33 of the detector generates a histogram containing only a gradation level of zero as shown in the view (C) of FIG. 11.

The view (D) of FIG. 11 is a histogram provided by the step 6 of the scan zone 53. At the step 6, the scanner 54 detects in the scan zone 53 a part where the hand is present and a part where no hand is present. As a result, the detector assigned to the scanner 54 provides a histogram containing a gradation level of 0 representative of the part where no hand is present and gradation levels 2 to 7 representative of the part where the hand is present and where brightness differences occur.

The view (E) of FIG. 11 is a histogram provided by each of the steps 7 to 12 of the scan zone 53. At each of the steps 7 to 12, the scanner 54 detects the hand in the scan zone 53. As a result, the detector assigned to the scanner 54 provides a histogram containing gradation levels of 2 to 7 representative of the hand and brightness differences caused by the hand.

The view (F) of FIG. 11 is a histogram provided by the step 13 of the scan zone 53. At the step 13, the scanner 54 detects in the scan zone 53 a part where the hand is present and a part where no hand is present. As a result, the detector assigned to the scanner 54 provides a histogram containing a gradation level of 0 representative of the part where no hand is present and gradation levels 2 to 7 representative of the part where the hand is present and where brightness differences occur.

Based on the image signal extracted by the extractor, the detector assigned to the scanner 54 provides a detection signal indicative of a hand area in the scan zone 53. Based on the detection signal, the CPU 18 generates a hand ratio HRS(j) [%] for each step j (j=0 to 19) in the scan zone 53. The hand ratio HRS(j) is calculated as follows:

$$HRS(j) = \frac{\sum_{i=2}^{i=7} hist(j)[i]}{\sum_{i=0}^{i=7} hist(j)[i]} \times 100 \qquad (4)$$

where hist(j)[i] is a histogram of gradation level i in step j (j=0 to 19). Although the embodiment finds a hand ratio HRS according to histograms of gradation levels 2 to 7, this does not limit the present invention.

According to Embodiment 2, an average HRA of the hand ratios HRS (j) of the steps j in the scan zone 53 is calculated according to the below-mentioned expression (5). The hand ratio average HRA corresponds to the hand ratio HR obtained from the expression (3) of Embodiment 1. The CPU 18 serves as a generator to generate the average HRA of the hand ratios HRS (j). Then, the CPU 18 serves as a controller to determine a zoom parameter (FIG. 7) according to the hand ratio average HRA and control the zooming function of the scaler 14.

$$HRA = \frac{\sum_{j=0}^{j=19} HRS(j)}{20} \qquad (5)$$

The timing when the CPU 18 controls the zooming function of the scaler 14 is equal to that explained with reference to the graphs (A) to (D) of FIG. 8.

Embodiment 3

Embodiment 3 according to the present invention will be explained. This embodiment relates to a zooming function and shifting function realized by the electronic appliance (television set 1) shown in FIGS. 2 to 4, to control the size and position of an image of the user 3 on the display 21.

Figure 12:
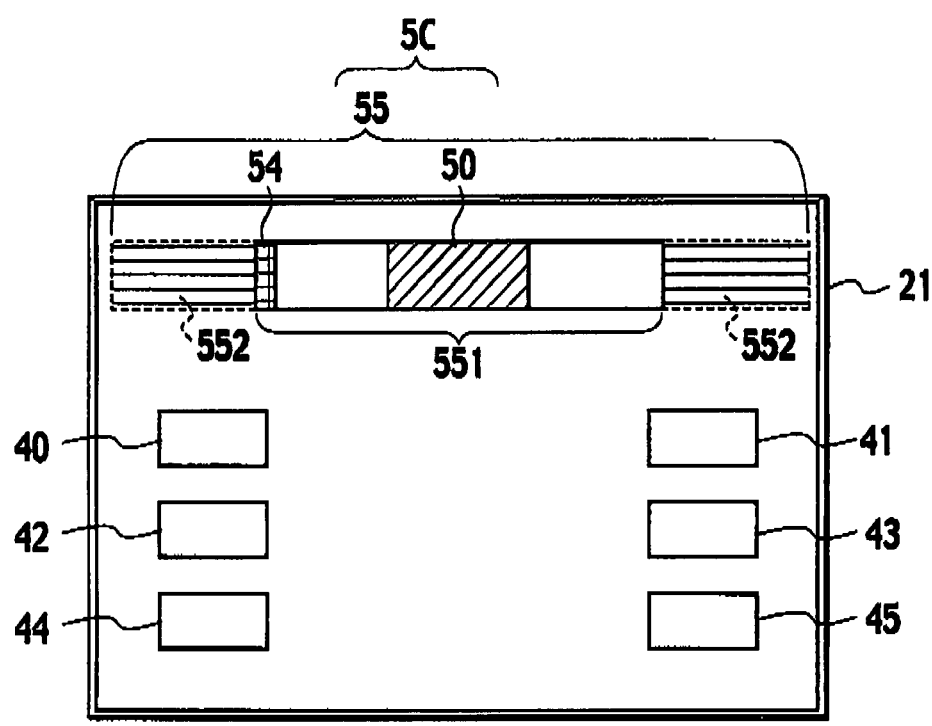
FIG. 12 is a view showing a zoom button 5C according to Embodiment 3 of the present invention.

FIG. 12 shows an operational image generated by the graphics generator 15 (FIG. 2) and displayed on the display 21. The operational image includes a zoom button 5C that includes a control button 50 for activating the zooming function and a measurement zone 55. The control button 50 is superimposed on the measurement zone 55. The operational image also includes menu buttons 40 to 45.

The measurement zone 55 functions like the measurement zone 51 of Embodiment 1. The measurement zone 55 consists of an initial measurement zone 551 and a reserve zone 552. The initial measurement zone 551 is a zone in which a scanner 54 is moved in an initial state in which the hand of the user 3 is not projected on the zoom button 5C. The initial measurement zone 551 is defined around the control button 50, and according to Embodiment 3, is equal to the measurement zone 51 of Embodiment 1 in size. Like the case shown in FIG. 11, the scanner 54 is moved through the initial measurement zone 551 in 20 steps. The scanner 54 is continuously moved through the initial measurement zone 551 until the user 3 manipulates the control button 50.

The zoom button 5C must be positioned so that it can easily be manipulated by the user 3 wherever the user 3 is. For example, the zoom button 5C is positioned at an upper center part or a center part of the display 21. In FIG. 12, the control button 50 and initial measurement zone 551 are arranged at the center of the measurement zone 55. This arrangement, however, does not limit the present invention. According to Embodiment 3, the initial measurement zone 551 is visible to the user 3 and the measurement zone 55 is invisible to the user 3. This configuration, however, does not limit the present invention.

As mentioned above, a mirror-converted-and-scaled image from the mirror image converter 13 and scaler 14 includes detection zones corresponding to the control button 50 and menu buttons 40 to 45, respectively. The detection zone for the control button 50 is a detection zone 500 (not shown) and the detection zone for the measurement zone 55 and initial measurement zone 551 is the scanner 54 whose area is smaller than the area of the measurement zone 55. The detection zones for the menu buttons 40 to 45, the detection zone 500, and the scanner 54 are detected by the detectors 171 to 17n of the detection unit 17 (FIG. 2), respectively.

The scanner 54 is moved in the measurement zone 55 according to timing pulses supplied from the move controller, i.e., the CPU 18 and timing pulse generator 12 to the timing gate 31. The move controller sequentially moves the scanner 54 through the measurement zone 55 in a predetermined time. According to Embodiment 3, the first scan technique of FIG. 10 is employed to continuously move the scanner 54 through the initial measurement zone 551 until the user 3 manipulates the control button 50.

Figure 13A:
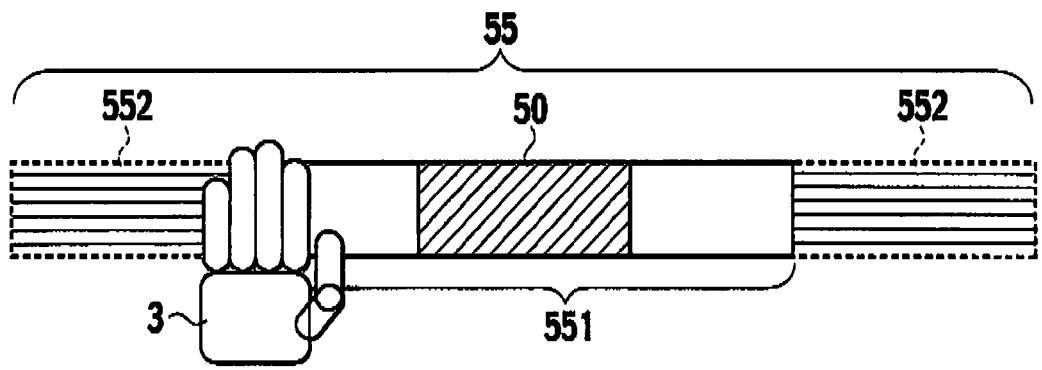
FIGS. 13A to 13C are views showing three states of a user's hand on the zoom button 5C.
Figure 13B:
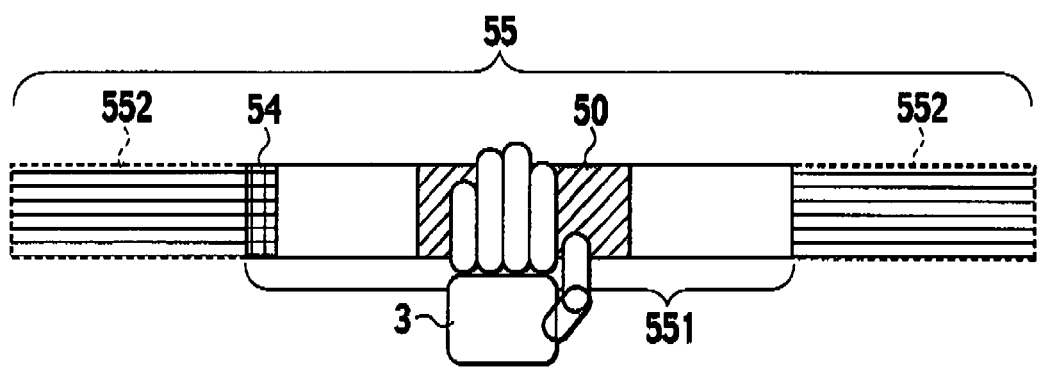
Figure 13C:
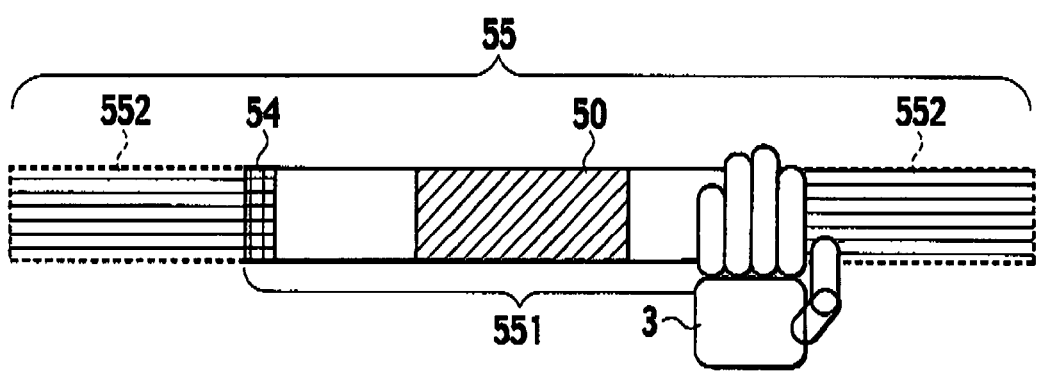

When the user 3 holds his or her hand on the zoom button 5C to start the zooming function, the hand may be out of the control button 50 due to some reason. FIGS. 13A to 13C show various states of the hand of the user 3 on the zoom button 5C. As mentioned above, the measurement zone 55 is invisible to the user 3, and therefore, the user 3 sees each end of the initial measurement zone 551 as an end of the zoom button 5C.

In FIG. 13A, the hand is at a left end of the initial measurement zone 551. In FIG. 13B, the hand is at the center of the initial measurement zone 551. In FIG. 13C, the hand is at a right end of the initial measurement zone 551.

Figure 14A:
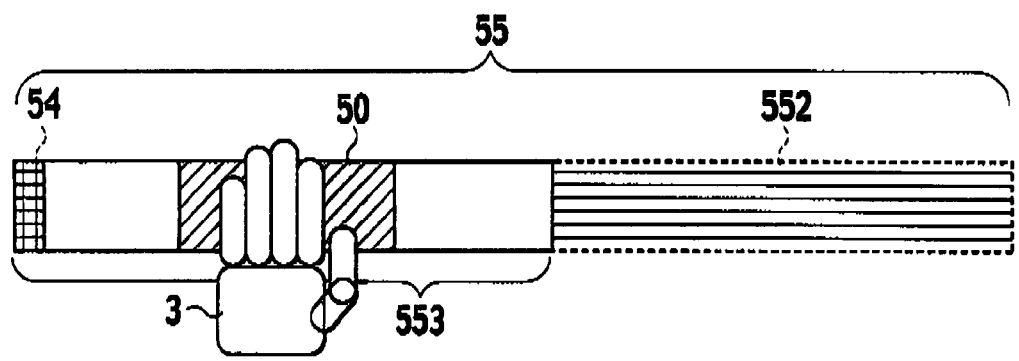
FIGS. 14A to 14C are views showing states of the user's hand corrected from the three states shown in FIGS. 13A to 13C.
Figure 14B:
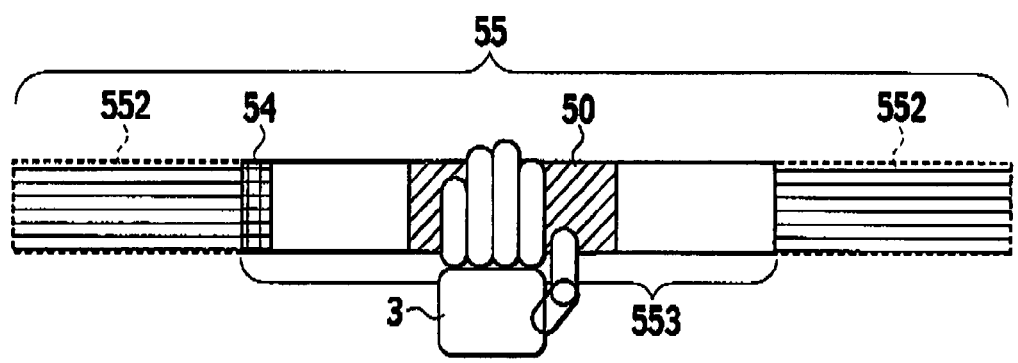
Figure 14C:
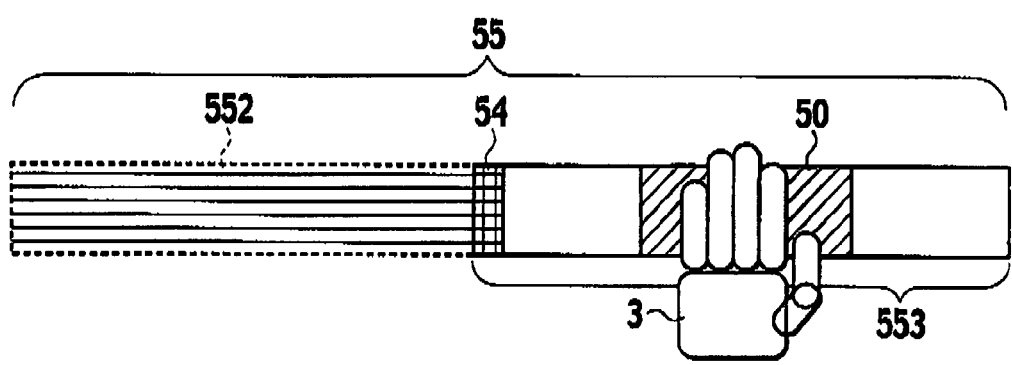

FIGS. 14A to 14C show that the control button 50 and a zone 553 through which the scanner 54 is moved have been shifted in the measurement zone 55 from the states of FIGS. 13A to 13C according to hand positions in the zoom button 5C. The zone 553 through which the scanner 54 is moved is referred to as "corrected measurement zone 553." The initial measurement zone 551 and corrected measurement zone 553 have substantially the same area. The corrected measurement zone 553 and control button 50 are collectively referred to as "movable button."

FIG. 14A shows that the movable button consisting of the control button 50 and corrected measurement zone 553 has been moved so that the control button 50 is positioned around the hand which has been at the left end of the initial measurement zone 551 in FIG. 13A. Similarly, FIGS. 14B and 14C show that the movable button has been moved from the states of FIGS. 13B and 13C so that the control button 50 is positioned around the hand.

Shifting the movable button will be explained in more detail.

An algorithm for detecting the position of an image of a hand on the zoom button 5C will be explained.

According to timing pulses supplied to the timing gate 31, the scanner 54 is moved through the initial measurement zone 551 in 20 steps as shown in the view (B) of FIG. 11. Sequentially moving the scanner 54 through the initial measurement zone 551 results in making the extractor consisting of the object extractor 30 and timing gate 31 extract an image signal representative of the initial measurement zone 551 from a mirror-converted-and-scaled image provided by the mirror image converter 13 and scaler 14. According to the extracted image signal, the detector (one of the detectors 171 to 17n of FIG. 2) assigned to the scanner 54 generates a detection signal indicative of a hand area ratio in the initial measurement zone 551.

According to the detection signal, the CPU 18 generates information indicative of a hand ratio HRS(j) in each step j (j=0 to 19) of the initial measurement zone 551 with the use of the expression (4). To avoid variation due to noise, any step j having a hand ratio HRS(j) of lower than 30% is set to have a hand ratio HRS(j) of 0.

According to Embodiment 3, the detection signal from the detector assigned to the scanner 54 includes information indicative of the position of the hand in the initial measurement zone 551. According to the detection signal, the CPU 18 generates information indicative of a barycenter HRC of the hand in the initial measurement zone 551 as follows:

$$HRC = \frac{\sum_{j=0}^{j=19}(j \times HRS(j))}{\sum_{j=0}^{j=19}(HRS(j))} \tag{6}$$

Based on the hand barycenter HRC, the CPU 18 moves the control button 50 to the hand barycenter HRC.

Moving the control button 50 to the hand barycenter HRC may be made by aligning a horizontal start point of the control button 50, which is one of parameters used to set the control button 50, with the hand barycenter HRC. An IIR filter shown in FIG. 15A is applied to the horizontal start point, to suppress an intermittent movement of the control button 50.

Figure 15A:
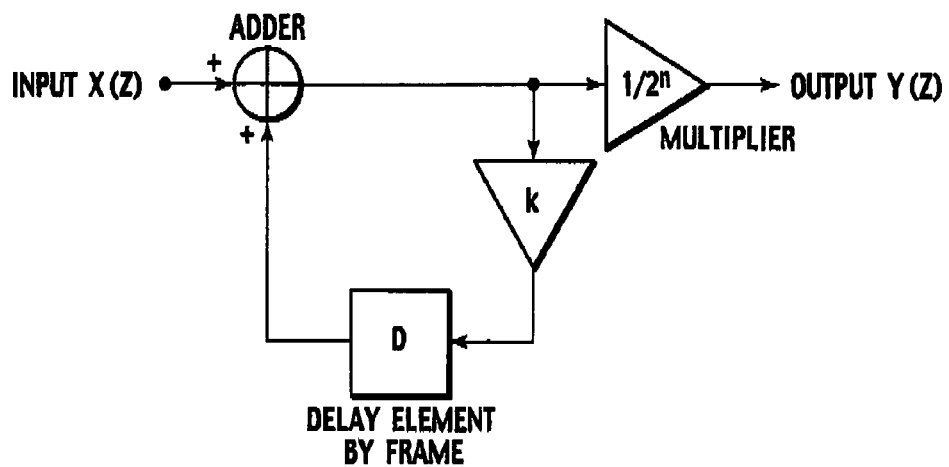
FIG. 15A is a block diagram showing an IIR filter according to an embodiment of the present invention.

The IIR filter shown in FIG. 15A is introduced in a time axis direction. The IIR filter achieves the intermittent movement suppressing effect with a small number of parts, is easy to change its response characteristics, and responds without hunting in the case of first-order transfer characteristic. The transfer characteristic is expressed as follows:

$$\frac{Y(z)}{X(z)} = \frac{1}{1 - kz^{-1}} \tag{7}$$

$$k = 1 - \frac{1}{2^n}$$

where k is a feedback coefficient (leak coefficient) and k<1.

Figure 15B:
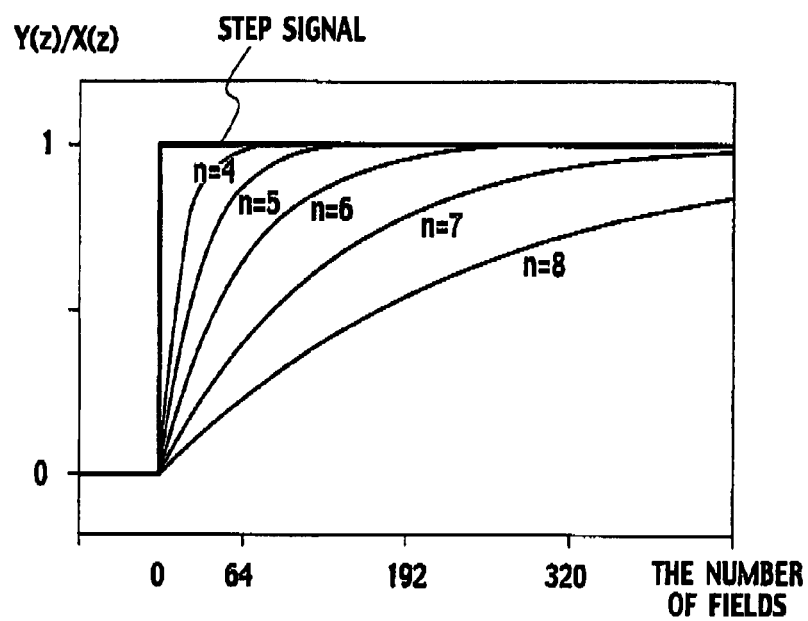
FIG. 15B is a graph showing characteristics of the IIR filter.

FIG. 15B shows characteristic curves of the IIR filter. An abscissa represents the number of fields and an ordinate represents transfer characteristics obtained according to the expression (7). Depending on a parameter "n" for determining a feedback coefficient value, a response speed can be changed.

According to Embodiment 3, the IIR filter is realized by software. The IIR filter may be realized by hardware.

Through the processes mentioned above, the control button 50 is moved to the position of the user's hand.

Thereafter, the CPU 18 fixes the position of the control button 50 so that the control button 50 may stably operate without the influence of hand motion. The stabilization of the control button 50 is carried out when the activation flag shown in the graph (C) of FIG. 8 rises. The CPU 18 also moves the detection zone 500 for the control button 50 by changing timing pulses supplied to the timing gate 31.

According to the information indicative of the hand barycenter HRC, the move controller (the CPU 18 and timing pulse generator 12) moves, within the measurement zone 55, the scan zone from the initial measurement zone 551 to the corrected measurement zone 553. The corrected measurement zone 553 is positioned around the control button 50. Shifting the moving range of the scanner 54 is carried out by the move controller by controlling timing pulses supplied to the timing gate 31. As a result, the movable button (consisting of the corrected measurement zone 553 and control button 50) is moved so that the control button 50 is positioned around the barycenter of an image of the user's hand as shown in FIGS. 14A to 14C.

According to Embodiment 3, the CPU 18 shifts the movable button by controlling the shifting function of the scaler 14 according to hand position information obtained from the hand barycenter HRC. According to an average HRA of hand ratios HRS (j) of steps j in the corrected measurement zone 553 obtained according to the expression (5), the CPU 18 determines a zoom parameter shown in FIG. 7 to carry out the zooming function of the scaler 14.

Figure 16:
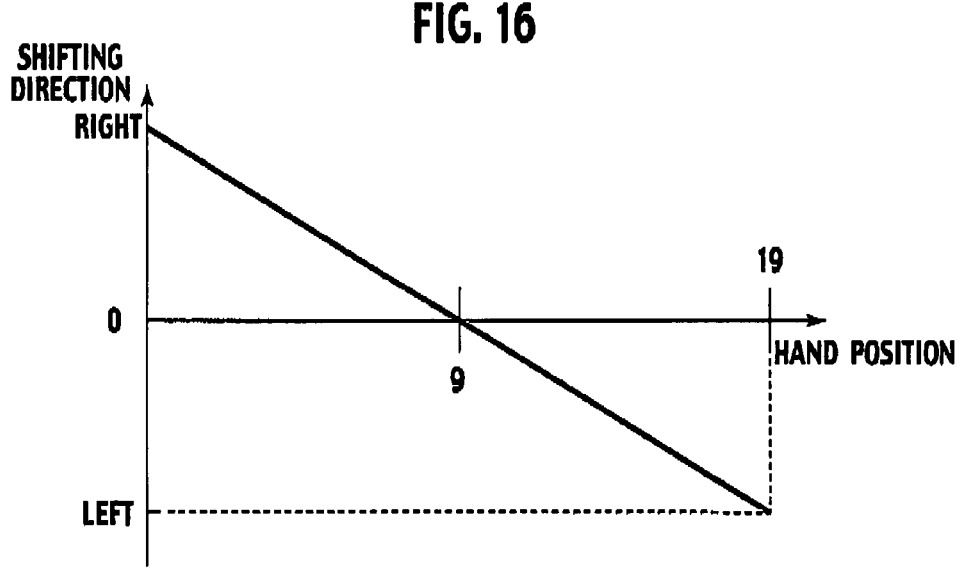
FIG. 16 is a graph showing a shift parameter to be set for the scaler 14 shown in FIG. 2.

FIG. 16 is a graph showing a shift parameter used by the CPU 18 serving as a controller to control the shifting function of the scaler 14. In FIG. 16, an ordinate represents a shift direction and an abscissa represents a step j corresponding to a hand position. Although Embodiment 3 employs 20 steps (j=0 to 19) in total, the present invention is not limited to this. If the hand is located at a left end of the initial measurement zone 551 at the start of measurement, the movable button consisting of the control button 50 and corrected measurement zone 553 is shifted rightward in the measurement zone 55 so that the movable button may move to the left when viewed by the user 3. When the movable button is shifted, the detection zone 500 for the control button 50 and the moving range of the scanner 54 are also changed in an image signal provided through the mirror image converter 13 and scaler 14.

If the user's hand is at the center of the initial measurement zone 551 at the start of measurement, the CPU 18 determines that the user 3 is at an optimum position for controlling the television set 1, and therefore, does not activate the shifting function of the scaler 14. If the user's hand is at a right end of the initial measurement zone 551 at the start of measurement, the CPU 18 controls the scaler 14 to shift the movable button leftward in the measurement zone 55 so that the movable button may shift to the right with respect to the user 3. When the movable button is shifted, the detection zone 500 for the control button 50 and the moving range of the scanner 54 are also changed in an image signal provided through the mirror image converter 13 and scaler 14.

Timing of activating the zooming function is as shown in FIG. 8. When the zoom determination flag shown in the graph (D) of FIG. 8 rises and after the time constant Tm passes, the scanner 54 starts to move through the corrected measurement zone 553.

The detector assigned to the scanner 54 generates a detection signal indicative of a hand area ratio in the corrected measurement zone 553. According to the detection signal, the CPU 18 serving as a generator generates information indicative of a hand ratio HRS(j) of each step j in the corrected measurement zone 553 with the use of the expression (4). Then, the CPU 18 generates information indicative of a hand ratio average HRA according to the expression (5). Thereafter, the CPU 18 determines a zoom parameter shown in FIG. 7 according to the information indicative of the hand ratio average HRA, thereby controlling the zooming function of the scaler 14. To avoid variation due to noise, any step j having a hand ratio HRS(j) of lower than 30% is set to have a hand ratio HRS(j) of 0.

Figure 17:
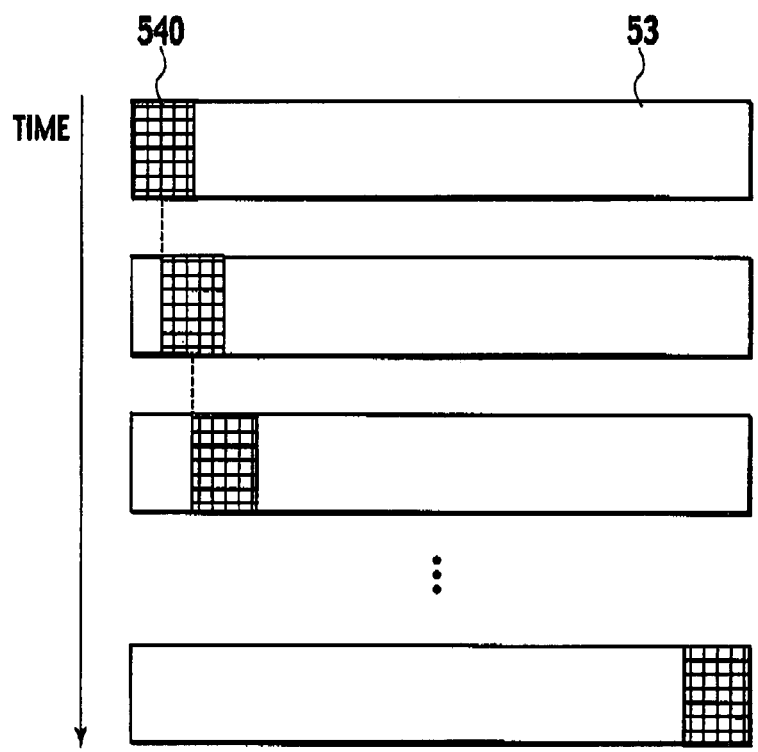
FIG. 17 is a view showing a scanner 540 according to an embodiment of the present invention, the scanner 540 being a modification of a scanner 54 shown in FIG. 9.

FIG. 17 shows a scanner 540 that is a modification of the scanner 54. Scanning progresses from the top to the bottom of FIG. 17. The scanner 540 can detect data from a wider region than the scanner 54. For example, the scanner 540 can detect a region covering two steps of the scan zone 53 at one time. The scanner 540 is moved from the left end (step 0) of the scan zone 53 toward the right end (step 19) thereof step by step. Namely, the scanner 540 twice detects data from each step, to realize stable operation when finding, for example, a hand barycenter HRC.

Figure 18:
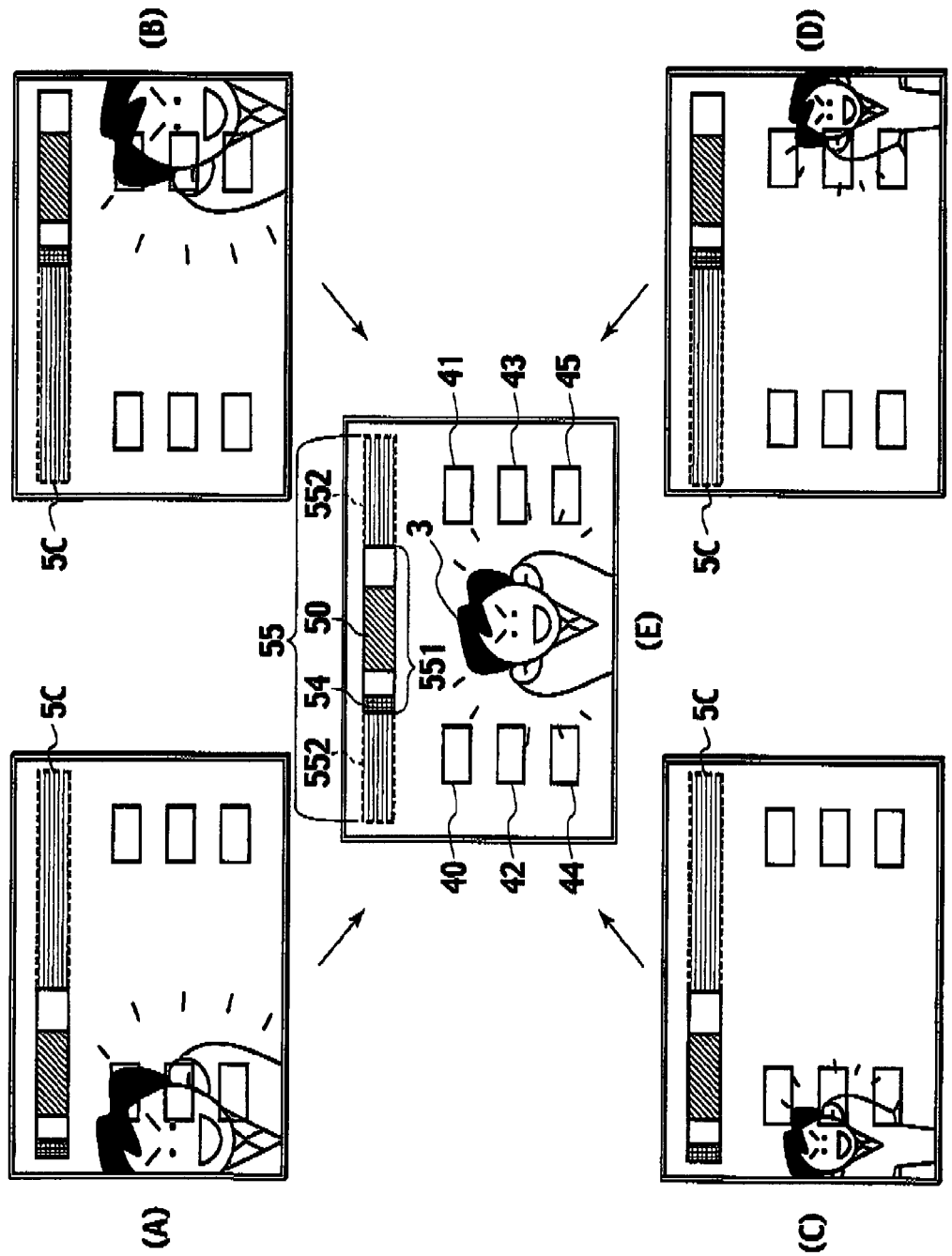
FIG. 18 is a view explaining the optimization of the size and position of a user's image on a display according to Embodiment 3.

FIG. 18 shows optimization of the size and position of an image of the user 3 on the display 21 carried out with the zooming function and shifting function of the scaler 14 according to Embodiment 3. Here, the "optimization" means to display an image of the user 3 at the center of the display 21 in a proper size as shown in a view (E) of FIG. 18.

A view (A) of FIG. 18 shows that an image of the user 3 is displayed at a left end of the display 21 in a large size. To optimize the image like that in the view (E), the CPU 18 controls the scaler 14 to reduce the user's image provided by the video camera 2 or the mirror image converter 13 and shift the image on the display 21 to the right.

A view (B) of FIG. 18 shows that an image of the user 3 is displayed at a right end of the display 21 in a large size. To optimize the image like that in the view (E), the CPU is controls the scaler 14 to reduce the user's image provided by the video camera 2 or the mirror image converter 13 and shift the image on the display 21 to the left.

A view (C) of FIG. 18 shows that an image of the user 3 is displayed at a left end of the display 21 in a small size. To optimize the image like that in the view (E), the CPU 18 controls the scaler 14 to enlarge the user's image provided by the video camera 2 or the mirror image converter 13 and shift the image on the display 21 to the right.

A view (D) of FIG. 18 shows that an image of the user 3 is displayed at a right end of the display 21 in a small size. To optimize the image like that in the view (E), the CPU 18 controls the scaler 14 to enlarge the user's image provided by the video camera 2 or the mirror image converter 13 and shift the image on the display 21 to the left.

An image provided by the video camera 2 is wider in range than an image displayed on the display 21. Accordingly, even if the image from the video camera 2 is reduced or enlarged to optimize the displayed image as shown in FIG. 18, the displayed image will not be cut.

Figure 19:
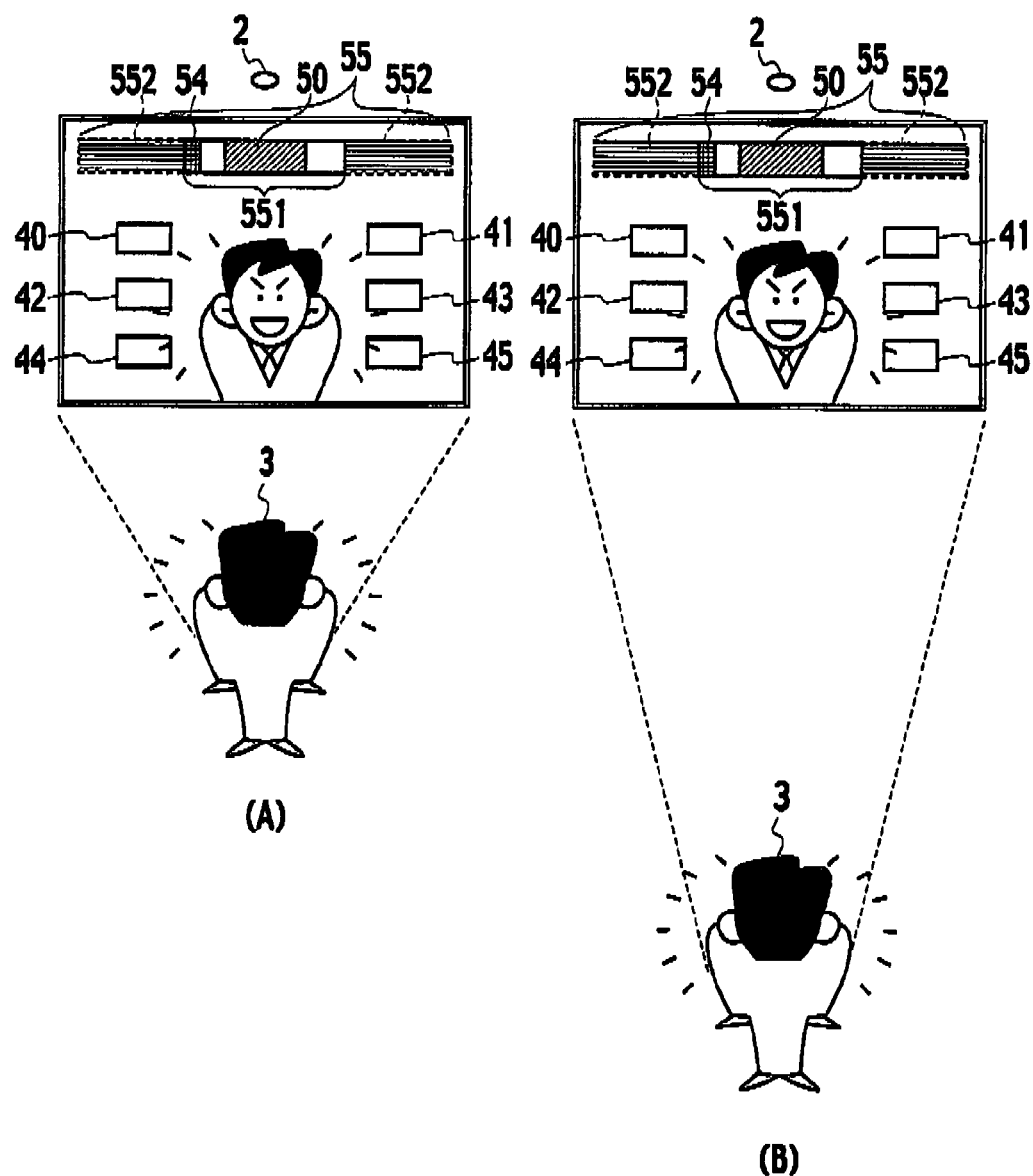
FIG. 19 is a view showing adjusted user's images according to Embodiment 3.

A view (A) of FIG. 19 shows that the user 3 is closer to the display 21 and a view (B) of FIG. 19 shows that the user 3 is away from the display 21. Wherever the user 3 is, an image of the user 3 photographed by the video camera 2 can be displayed in the same size on the display 21 according to the present invention. With the use of the zooming function and shifting function of the scaler 14 according to the present invention, a relationship between the size of an image of the user 3 provided by the video camera 2 or the mirror image converter 13 and the size of an operational image provided by the graphics generator 15 is unchanged on the display 21 wherever the user 3 is. Namely, an operation conducted by the user 3 with respect to, for example, the control button 50 can surely be detected without regard to the position of the user 3, to thereby improve the operability of the electronic appliance (television set 1) for the user 3.

It should be understood that many modifications and adaptations of the invention will become apparent to those skilled in the art and it is intended to encompass such obvious modifications and changes in the scope of the claims appended hereto.

What is claimed is:

1. An electronic appliance comprising:
a video camera configured to photograph an operator who is in front of the video camera and operates the electronic appliance, and obtain an image including an image of the operator;
a mirror image converter configured to convert the image including the image of the operator provided by the video camera into a mirror image;
an image adjuster configured to adjust the size of the image including the image of the operator provided by one of the video camera and mirror image converter;
a display configured to display the image including the image of the operator provided by the image adjuster;
a measurement zone having a first area, the measurement zone being used to adjust the size of the image including the image of the operator on the display, the operator overlaying an object so that an image of the object is displayed in the measurement zone;
a generator configured to generate information indicative of a ratio of an area of the object's image in the measurement zone to the first area; and
a controller configured to control the image adjuster according to the information provided by the generator so that the image adjuster optimizes the size of the image including the image of the operator on the display, such that as the ratio of the area of the object's image in the measurement zone to the first area becomes smaller, a zoom magnitude becomes larger, and as the ratio of the area of the object's image in the measurement zone to the first area becomes larger, the zoom magnitude becomes smaller.

2. The electronic appliance of claim 1, further comprising:
an operational image generator configured to generate an operational image including a control button to be superimposed on the measurement zone;
a mixer configured to mix the operational image with the image including the image of the operator from the image adjuster into a mixed image; and
a first detector configured to generate a first detection signal from an image signal representative of an operation that is conducted by the operator with the object with respect to a first detection zone having a second area smaller than the first area that corresponds to the control button,
wherein in response to the first detection signal, the controller controls the image adjuster so that the image adjuster optimizes the size of the operator's image on the display.

3. The electronic appliance of claim 2, wherein the controller controls the image adjuster when the ratio of the area of the object's image in the measurement zone to the first area reaches a first value and the ratio of the area of the object's image in the first detection zone to the second area reaches a second value.

4. The electronic appliance of claim 1, further comprising:
an extractor configured to extract, from the image including the image of the operator, a partial image corresponding to a second detection zone that agrees with the measurement zone; and
a second detector configured to generate, according to the partial image, a second detection signal indicative of a ratio of the area of the object's image to the second detection zone having the first area,
wherein the generator generates information according to the second detection zone, and
wherein the controller controls the image adjuster according to the information.

5. The electronic appliance of claim 1, further comprising:
a move controller configured to sequentially move a third detection zone through the measurement zone in a predetermined time, the third detection zone having a second area that is smaller than the first area of the measurement zone;
an extractor configured to extract, from the image including the image of the operator, a partial image corresponding to the measurement zone when the move controller moves the third detection zone through the measurement zone; and
a second detector configured to generate, according to the partial image, a second detection signal indicative of a ratio of the area of the object's image to the second detection zone having the first area,
wherein the generator generates information according to the second detection zone, and
wherein the controller controls the image adjuster according to the information.

6. The electronic appliance of claim 5, wherein:
the second detection signal includes information indicative of a position of the object in the measurement zone; and
the image adjuster moves the image including the image of the operator on the display according to the second detection signal.

7. The electronic appliance of claim 5, wherein:
the measurement zone includes an initial measurement zone through which the third detection zone is initially moved and a reserve zone adjoining the initial measurement zone, the second detection signal generated by the second detector includes positional information indicative of a position of the object in the measurement zone; and
the electronic appliance further comprises a zone controller configured to shift, according to the positional information, a zone through which the third detection zone is moved from the initial measurement zone to a zone that is in the measurement zone including the initial measurement zone and reserve zone and is optimum for the object.

* * * * *